(12) United States Patent
Horiguchi

(10) Patent No.: US 10,718,438 B2
(45) Date of Patent: Jul. 21, 2020

(54) FLUID CONTROL VALVE AND FLUID CONTROL VALVE ASSEMBLING METHOD

(71) Applicant: Kitz SCT Corporation, Tokyo (JP)

(72) Inventor: Hajime Horiguchi, Gunma (JP)

(73) Assignee: KITZ SCT CORPORATION, Tokyo (JP)

( * ) Notice: Subject to any disclaimer, the term of this patent is extended or adjusted under 35 U.S.C. 154(b) by 0 days.

(21) Appl. No.: 16/204,099

(22) Filed: Nov. 29, 2018

(65) Prior Publication Data
US 2019/0178394 A1    Jun. 13, 2019

(30) Foreign Application Priority Data
Dec. 8, 2017   (JP) ................. 2017-235673

(51) Int. Cl.
  *F16K 7/12*   (2006.01)
  *F16K 25/00*   (2006.01)
  *F16K 31/122*   (2006.01)
  *F16K 7/17*   (2006.01)

(52) U.S. Cl.
  CPC ............... *F16K 7/12* (2013.01); *F16K 7/17* (2013.01); *F16K 25/00* (2013.01); *F16K 31/122* (2013.01); *F16K 31/1221* (2013.01); *F16K 31/1225* (2013.01)

(58) Field of Classification Search
  CPC ... F16K 7/12; F16K 7/16; F16K 25/00; F16K 31/122; F16K 31/1221; F16K 31/1225
  USPC .................. 251/333, 360, 361, 362
  See application file for complete search history.

(56) References Cited

U.S. PATENT DOCUMENTS

| | | | | |
|---|---|---|---|---|
| 2,936,776 | A * | 5/1960 | Veatch | F16K 27/0272 137/375 |
| 3,556,070 | A * | 1/1971 | Holcomb | F01M 1/00 123/196 S |
| 3,591,138 | A * | 7/1971 | Wolfe | G05D 23/1921 251/333 |
| 5,413,311 | A * | 5/1995 | Arstein | F16K 7/16 251/229 |
| 6,092,550 | A * | 7/2000 | Gotch | F16K 7/16 137/331 |
| 7,416,165 | B2 * | 8/2008 | Ohmi | F16K 51/02 251/331 |

(Continued)

FOREIGN PATENT DOCUMENTS

| | | |
|---|---|---|
| JP | 5054904 | 10/2012 |
| JP | 5243513 | 7/2013 |

*Primary Examiner* — William M McCalister
(74) *Attorney, Agent, or Firm* — Wenderoth, Lind & Ponack, L.L.P.

(57) ABSTRACT

To provide a fluid control valve for use under high-temperature conditions and capable of achieving high durability and Cv value stability even with many operations, and a method of assembling the fluid control valve, a fluid control valve includes an annular valve seat provided inside a body having an inflow port and an outflow port and a diaphragm opposed to the annular valve seat to be in contact therewith or away therefrom by an ascending/descending motion of an actuator rod or a manual rod. A contact surface, which is an upper surface of the annular valve seat, to be in contact with and away from the diaphragm has a tapered surface formed along a centripetal direction of the annular valve seat.

6 Claims, 9 Drawing Sheets

(56) References Cited

U.S. PATENT DOCUMENTS

| | | | | |
|---|---|---|---|---|
| 7,537,194 | B2* | 5/2009 | Nagai | F16K 1/38 251/122 |
| 7,686,280 | B2* | 3/2010 | Lowery | F16K 7/14 251/331 |
| 8,172,197 | B2* | 5/2012 | Gu | F16K 7/17 137/625.27 |
| 10,145,479 | B2* | 12/2018 | Kitano | F16K 7/14 |
| 10,323,757 | B2* | 6/2019 | Nakata | F16K 7/14 |
| 2002/0092999 | A1* | 7/2002 | Longo | F16K 7/16 251/331 |
| 2006/0118752 | A1* | 6/2006 | Tin-Kai | F16K 7/16 251/331 |
| 2006/0152001 | A1* | 7/2006 | Matsuhashi | C22C 38/001 285/339 |
| 2007/0045587 | A1* | 3/2007 | Kolenc | F16K 1/465 251/331 |
| 2007/0187634 | A1* | 8/2007 | Sneh | F16K 7/14 251/30.01 |
| 2008/0173834 | A1* | 7/2008 | Aoyama | F16K 7/16 251/89 |
| 2008/0210312 | A1* | 9/2008 | Glime | F16K 1/34 137/375 |
| 2008/0224081 | A1* | 9/2008 | Miyazaki | F16K 1/30 251/331 |
| 2008/0290312 | A1* | 11/2008 | Hirose | F16K 7/12 251/333 |
| 2010/0090151 | A1* | 4/2010 | Tanikawa | F16J 3/02 251/331 |
| 2011/0308655 | A1* | 12/2011 | Keeper | F16K 7/16 138/89 |
| 2012/0097881 | A1* | 4/2012 | Aoyama | F16K 1/425 251/359 |
| 2015/0369378 | A1* | 12/2015 | Umeyama | F16K 1/42 137/486 |

* cited by examiner

GRADIENT (ANGLE) OF TANGENT OF SPHERICAL SURFACE

CALCULATION OF TILTED ANGLE OF DIAPHRAGM

FLUID CONTROL VALVE AND FLUID CONTROL VALVE ASSEMBLING METHOD

BACKGROUND OF THE INVENTION

Field of the Invention

The present invention relates to a fluid control valve capable of achieving stability in fluctuations of a Cv value with high accuracy even through an extremely large number of times of opening/closing operation under an environment at high temperatures, and a method of assembling the fluid control valve.

Description of the Related Art

Conventionally, as fluid control valves for use under a high-temperature environment, metal diaphragm valves of a so-called direct touch have been known, and have a basic structure as follows. A disk-shaped metal thin film (metal diaphragm) with high strength, high elasticity, and high anticorrosion is used as a valve diaphragm. With an outer periphery side interposed between a body and a bonnet, an outer seal part is annularly configured on the outer periphery of a valve chamber. With the center pressurized by a rod such as an actuator making an ascending/descending motion, the diaphragm makes contact with and is closely attached to an upper surface of an annular valve seat provided on a peripheral edge of an opening of a primary flow path inside the valve chamber to close the valve. On the other hand, when the diaphragm is released from pressurization by the rod, it is separated from the upper surface of the annular valve seat by self-resilience in shape to open the valve. Also, the annular valve seat is a ring-shaped member separate from the body and, in particular, is often swaged and fixed to a groove part as a resin-made seat ring.

The valves of this type have been demanded in various modes and various manufacturing fields including fields of electronics such as semiconductors and liquid crystals, nuclear-related fields, fine chemical, biotechnology, and further medical and foods and have been conventionally highly demanded particularly in a gas supply system in semiconductor manufacturing process. In semiconductor manufacturing process, there are devices required to be operate under a high-temperature environment including a vacuum chamber, an etching device, and a diffusion furnace. With these devices, a valve disposed inside, outside, and around these devices is often required to be submergible, that is, be able to operate always stably even as being submerged in a high-temperature atmosphere at a temperature, for example, 80 degrees Celsius to 200 degrees Celsius.

With further microfabrication and higher integration of semiconductors in recent years, in a valve which control a supply gas to film-forming process or the like, high integration at nearby positions are increasingly demanded, and flow-rate control with high accuracy is also demanded. Thus, in the above-described valve, extreme reduction in Cv value fluctuations is demanded even through opening/closing many times under high-temperature conditions.

In particular, as a thin-film growing process in recent years, a so-called ALD process has been increasingly demanded. In the ALD process, thin-film growth is controlled by stacking layers one by one at an atomic and nano level. Thus, in a gas supply line, different fluids have to be switched at extremely high speeds to successively repeat a supply-discharge cycle to a chamber. To control thin-film growth at an atomic layer level, a life of valve opening/closing at a level of ten million times is normally required to acquire thin-film growth at a product requirement level on a wafer. Thus, high durability of capable of resisting the number of times of use at a level extremely exceeding a conventionally-assumed level is essential also for the valve. Also, high-speed valve opening/closing responsivity is also essential. Also in the ALD process, the temperature is required to be kept at approximately 200 degrees Celsius to stably supply a supply gas, and therefore the valve is required to have resistance to high temperatures at this level.

Meanwhile, the inventors of the present invention have set a problem of stabilizing Cv value fluctuations of the above-described valve with high accuracy even through opening/closing many times under a high-temperature environment and, during diligent studies on fluctuation factors, have turned their attention to contribution from fluctuations in the sectional area of a flow path inside a valve chamber, in particular, a flexibly-deformed member directly defining an opening area for inflow from a primary flow path to the inside of the valve chamber. Then, the inventors have obtained the fact that, in particular, with the upper surface of the annular valve seat continuously receiving pressurization and strokes many times by the lower surface of a diaphragm piece under a high-temperature environment, the shape of the annular valve seat is deformed although slightly, which have a large influence. In particular, when the valve seat is made of resin, because of high temperatures which tend to promote swelling and continuous high-speed strikes which tend to promote a creep act on the valve seat to bring a unique shape deformation, and it is assumed that this deformation is a primary factor in Cv value fluctuations.

By contrast, several conventional technique have been known to solve the problem of Cv value fluctuations due to changes of a member with time because the valve is opened and closed many time at high speed as being exposed to a high-temperature fluid in ALD process or the like. As for deformation of the valve seat, Japanese Patent No. 5243513 has been suggest. In addition, for example, Japanese Patent No. 5054904 has been suggested.

Japanese Patent No. 5243513 discloses a valve structure of a fluid control valve. A valve seat member of the fluid control valve of this patent gazette is made of fluorine-based rein having a substantially rectangular shape. A contact surface of this valve seat member in contact with and away from a diaphragm is formed of a flat upper surface in a completely horizontal direction (a vertical direction with respect to an axial line direction of the fluid control valve), which is what the patent gazette only discloses regarding the contact surface. In this patent gazette, this valve seat member is formed so that the material thickness in a height direction and the material thickness in a diameter direction are in a predetermined range of ratios. This shape reduces thermal expansion of the valve seat member and the amount of falling and the amount of resilience with valve opening/closing while the high-temperature fluid is flowing, thereby reducing Cv value fluctuations.

Japanese Patent No. 5054904 discloses a direct-touch-type metal diaphragm valve including a valve stroke adjustment mechanism for adjusting and fixing a position of a stem in a vertical direction to a setting position by adjusting a screwing length of a support cylinder of an actuator to a bonnet. In this patent gazette, only a sectional shape of the valve seat is depicted in a drawing. In the drawing, only a valve seat having a protruding upper surface is disclosed, in which a top surface of this protruding part serves as a contact part in contact with and away from a metal diaphragm. With reference to a drawing of a full-closed state in which a diaphragm is pressurized, the shape of this contact part has a horizontal surface in a narrow-width ring shape or a circular protruding part.

Also in Japanese Patent No. 5054904, by the valve stroke adjustment mechanism, the maximum valve stroke is set to be 55% to 70% of the swelling height of the metal diaphragm, thereby preventing deformation of the diaphragm with a maximum width in accordance with the maximum stroke and improving durability of the diaphragm. Also, adaptation of the valve made of synthetic resin is performed by performing successive opening/closing operations three thousand to ten thousand times at a predetermined temperature before valve shipping to stabilize the shape of the valve seat, and then valve stroke adjustment is performed, thereby reducing changes of the valve with time and stabilizing the Cv value.

BRIEF SUMMARY OF THE INVENTION

However, while Japanese Patent No. 5243513 is the one only found as a conventional technique paying attention to the annular valve seat for the purpose of reducing Cv value fluctuations in a high-temperature environment in the valve as described above, merely the valve seat member is solely considered, and only its thermal expansion is taken as a problem. A valve body retainer, the valve seat member, and a relation therebetween are not considered at all. That is, the shape of the upper surface (contact surface) of the contact/separate part of the valve body is merely a horizontally flat surface, and the shape of the lower surface of the valve body retainer is also merely a simple protruding curved surface. Thus, even with reference to this patent gazette, it is not possible to acquire useful knowledge about the above-described problem to which the inventors of the present invention turn their attention, that is, influences by deformation of the annular valve seat due to the diaphragm pieces continuously pressurizing the annular valve seat at high speeds at the time of valve closing, in particular, Cv value fluctuations of the valve with the relation with the diaphragm piece under a high-temperature environment.

Moreover, in Japanese Patent No. 5243513, flexible deformation of a diaphragm side is not considered at all, either. The diaphragm side is also a portion which directly influences the sectional area of the flow path and, in some cases, significantly influences Cv value fluctuations of the valve at a higher-temperature environment through high-speed opening/closing many times than a valve seat side. Therefore, the diaphragm side is a necessary element in considering Cv value fluctuations. In this sense, it is inevitable to say that the means disclosed in Japanese Patent No. 5243513 is insufficient.

On the other hand, in Japanese Patent No. 5054904, only the diaphragm side is taken into consideration. As described above, this suggested technique is to solve the problem of decreasing changes of the Cv value with time after opening/closing many times under a high-temperature environment by using a valve stroke adjustment mechanism. As for the valve seat which the inventors of the present invention also turn their attention to, although thermal expansion and changes with time have been mentioned, specific information about the valve seat, a diaphragm retainer, or a relation therebetween regarding the above problems is not suggested at all. That is, the upper surface (contact surface) of the valve seat in this patent gazette is merely a horizontal surface or a circular protruding part in a ring shape with a narrow width. Again, no knowledge about the valve seat, the diaphragm retainer, and a relation therebetween can be acquired at all. Other than that, no conventional technique discloses the above problem or means for solving the above problem.

The present invention has been developed to solve the above-described problems, and is to provide a fluid control valve for use under high-temperature conditions and capable of achieving high durability and Cv value stability even with many operations, and a method of assembling the fluid control valve.

To achieve the object described above, one aspect of the present invention is directed to a fluid control valve including an annular valve seat provided inside a body having an inflow port and an outflow port and a diaphragm opposed to the annular valve seat to be in contact therewith or away therefrom by an ascending/descending motion of an actuator rod or a manual rod, wherein a contact surface, which is an upper surface of the annular valve seat, to be in contact with and away from the diaphragm has a tapered surface formed along a centripetal direction of the annular valve seat.

Another aspect of the present invention is directed to the fluid control valve, in which a diaphragm piece moves in conjunction with the ascending/descending motion of any of the rods, and the diaphragm as being tightly attached by a lower surface of the diaphragm piece can be pressed to fit the tapered surface.

Still another aspect of the present invention is directed to the fluid control valve, in which the tapered surface has a tilted angle equal to or smaller by substantially 0.5 to 1 degree than an angle of a tilted surface formed on the lower surface of the diaphragm piece.

Yet another aspect of the present invention is direct to the fluid control valve, in which the annular valve seat is made of resin and the tilted angle of the tapered surface is substantially 3 degrees.

Yet another aspect of the present invention is directed to the fluid control valve, in which when the annular valve seat is fixed to a swaging part, a protrusion margin length of a head part of the annular valve seat protruding from an upper end of the swaging part is minimized.

Yet another aspect of the present invention is directed to the fluid control valve, in which a base part of the swaging part has a slightly large material thickness.

Yet another aspect of the present invention is directed to the fluid control valve further including an actuator for operating the diaphragm, wherein the actuator has a rod for opening and closing the diaphragm via the diaphragm piece by reciprocating movements and a piston for operating the rod by receiving an air pressure, and the rod and the piston as separate members are coupled via a predetermined seal material.

Yet another aspect of the present invention is directed to the fluid control valve, in which a difference between Cv values at ordinary temperatures and 200 degrees Celsius is equal to or smaller than 0.15.

Yet another aspect of the present invention is directed to the fluid control valve, in which a range of fluctuations of a Cv value of the fluid control valve while the fluid control valve is performing opening/closing operation from 0 to ten million times under high temperatures is kept within 10% with respect to an initial Cv value.

One aspect of the present invention is directed to a fluid control valve assembling method including assembling a fluid control valve with components of the fluid control valve subjected to a heating treatment at a temperature higher than ordinary temperatures, the fluid control valve including an annular valve seat provided inside a body having an inflow port and an outflow port and a diaphragm opposed to the annular valve seat to be in contact therewith or away therefrom by an ascending/descending motion of an actuator rod or a manual rod.

Another aspect of the present invention is directed to the fluid control valve assembling method, in which the temperature higher than the ordinary temperatures is substantially 80 degrees Celsius.

According to one aspect of the present invention, the contact surface of the annular valve seat for the diaphragm is a tapered surface. Therefore, deformation of the annular valve seat due to operations many times, changes in temperature, and so forth is hard to occur, durability is significantly improved. and excellent stability of Cv values can be acquired.

According to another aspect of the present invention, the contact surface of the annular valve seat is a tapered surface in accordance with the shape of the lower surface of the diaphragm piece. Therefore, a load is not applied as being extremely biased to part of the annular valve seat. With this, degradation of the annular valve seat is hard to occur even the valve is operated many times, and durability is significantly improved. Furthermore, through an "adaptation process" for conforming the annular valve seat to actual use conditions by performing predetermined opening and closing after assembling the fluid control valve (diaphragm valve) and before shipping, a load is uniformly applied to the annular valve seat, conforming occurs more favorably, and the Cv values are stabilized, which are further advantageous for durability improvement, compared with the case in which the contact surface of the annular valve seat has a horizontal surface or any other shape.

According to still another aspect of the present invention, the annular valve seat is not degraded even with operations many times, and durability is excellent. Furthermore, while the surface pressure is kept uniform, changes of the Cv value due to valve opening/closing can be reduced, and the Cv values can be stabilized.

According to yet another aspect of the present invention, the contact surface of the annular valve seat is uniformly pressurized by the diaphragm, compared with a flat contact surface. Therefore, even with opening/closing operations many times, a possibility of a shape change can be eliminated, and durability is quite excellent.

According to yet another aspect of the present invention, the protrusion margin length of the head part of the annular valve seat is minimized. Therefore, even through valve opening/closing many times under a high-temperature environment, fluctuations in the height direction of the valve seat are extremely reduced. This is quite effective in reducing Cv value fluctuations of the valve.

According to yet another aspect of the present invention, when the annular valve seat is swaged, a position which tends to be bent by swaging can be adjusted in accordance with a position of the base part with a slightly large material thickness. For example, it is possible to make the bending position not too deep. This allows reduction in a risk of bending at a position other than an ideal position, for example, when the swaging jig does not accurately descend straight or when the pressurizing force is inappropriate.

According to yet another aspect of the present invention, the rod and the piston as separate members are coupled via a predetermined seal material. Therefore, even if a nonuniform force is applied to the rod and/or the piston or a deviation occurs therein, that force is absorbed by the seal material provided to the coupling portion, and favorable following movements can be made while sealing between the rod and the piston is kept. Thus, when the rod and the piston are integrally formed, it is possible to prevent troubles in which, for example, they operate inside the actuator as being tilted as a whole to make contact with a location not supposed to be touched and impair the actuator. Thus, durability of the actuator can be improved.

According to yet another aspect of the present invention, Cv value fluctuations can be reduced with higher accuracy, compared with the conventional technology. In the valve of the above-described type, it is possible to respond to high demands for flow-rate stability that are increasing in recent years.

According to yet another aspect of the present invention, also in the valve of the above-described type requiring continuous opening/closing at high speeds, flow-rate stability can be achieved with quite high accuracy.

According to yet another aspect of the present invention, the valve is assembled not at ordinary temperatures but at a temperature higher than ordinary temperatures. Thus, by assembling the valve with thermal expansion occurring in advance to some extent, even if the valve is used at high temperatures after assembled, stress occurring to the diaphragm is smaller than that when the valve is assembled at ordinary temperatures, a cruck of the diaphragm due to thermal expansion is hard to occur, and durability is improved.

According to yet another aspect of the present invention, by setting the assembling temperature is set at substantially 80 degrees, the valve can be assembled at a temperature in a temperature range allowing the operator to perform assembling operation by manual operation or the like as close as possible to the use temperature of the valve. This allows durability and productivity of the valve to be achieved both.

BRIEF DESCRIPTION OF THE DRAWINGS

FIG. 3A and FIG. 3B depict partially-enlarged sectional views of the annular valve seat of the present embodiment as being swaged and fixed inside a valve chamber of the valve together with a diaphragm piece depicted in an enlarged manner, in which FIG. 3A depicts a full-open state of the valve and FIG. 3B depicts a full-closed state of the valve;

FIG. 6A and FIG. 6B are graphs plotted with the tilted angle θ depicted in FIG. 4 on the vertical axis, in which FIG. 6A is a graph plotted with a distance r on the horizontal axis and FIG. 6B is a graph with a main part P of FIG. 6A depicted in an enlarged manner;

DETAILED DESCRIPTION OF THE INVENTION

Figure 1:
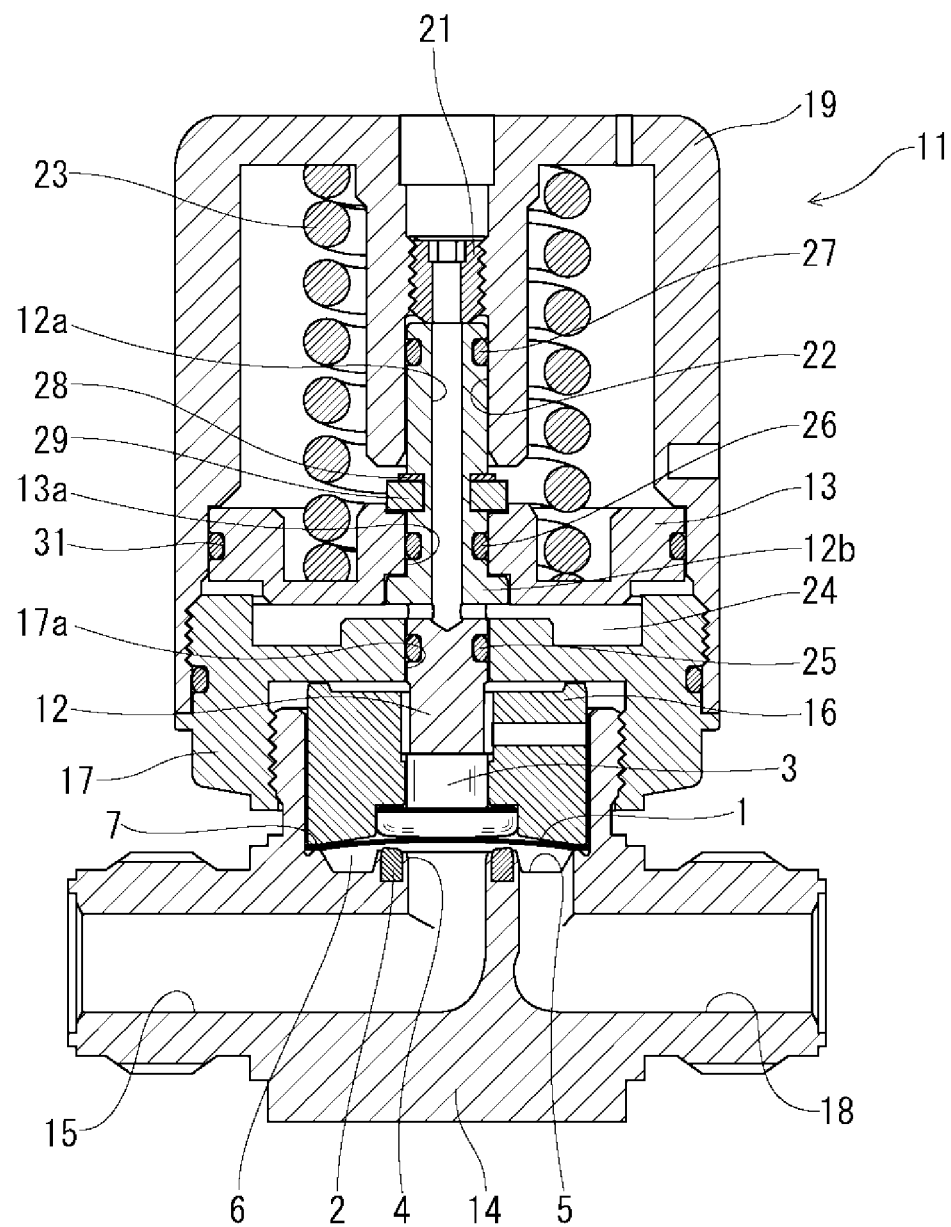
FIG. 1 is a longitudinal sectional view of an example of a valve using an annular valve seat of an embodiment.
Figure 2:
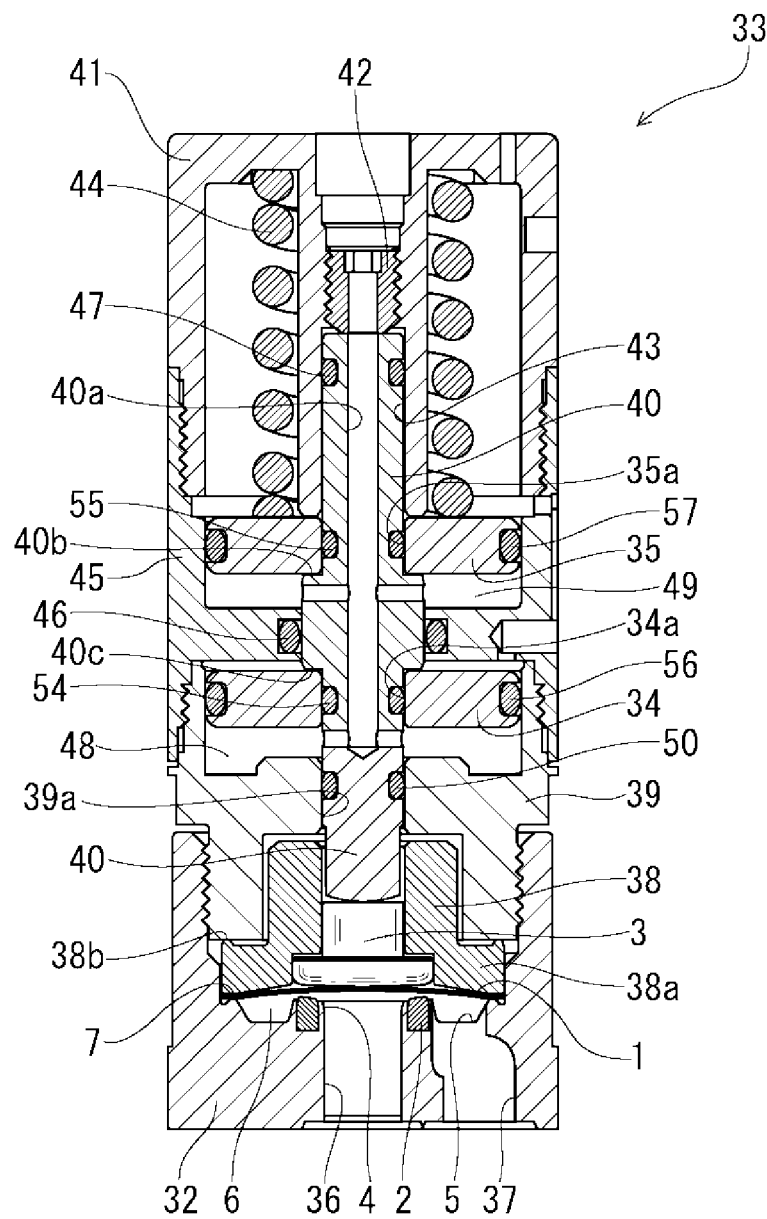
FIG. 2 is a longitudinal section view of another example of the valve using the annular valve seat of the present embodiment.

In the following, an embodiment of the fluid control valve of the present invention is described in detail with reference to the drawings. The fluid control valve of the present embodiment is a diaphragm valve using a diaphragm. As depicted in FIG. 1 and FIG. 2, the valve includes an annular valve seat 2 provided inside a body 14, 32 having an inflow port 4 and an outflow port 5 and a diaphragm 1 opposed to the annular valve seat 2 to be in contact therewith or away therefrom by an ascending/descending motion of a rod 12, 40. FIG. 1 is a longitudinal sectional view of an example of the valve of the present invention. FIG. 2 is a longitudinal sectional view of another example of the valve of the present invention.

Also, as will be described further below, these valve structures have actuator main bodies 11 and 33, respectively, mounted thereon. While the rods 12 and 40 in FIG. 1 and FIG. 2 are actuator rods, the valve of the present invention is not limited to an automatic valve and, although not depicted, may be a manual valve including a manual rod coupled to a manual handle or the like.

As will be described further below by using FIG. 1 and FIG. 2, a flow path of a fluid of the valve of the present invention communicates from a primary flow path 15, 36 via an annularly-opening inflow port 4 to a valve chamber 6 formed inside the body 14, 32. On an peripheral edge part of the opening of this inflow port 4, an attachment groove part 8 is formed where the annular valve seat 2 of the present invention can be fixedly attached. This attachment groove part 8 has inner and outer walls both serving as swaging parts 9 and 10, and the annular valve seat 2 is swaged and fixed to the attachment groove part 8.

Also, the diaphragm 1 covers the upper side of the valve chamber 6. On the outer periphery of this diaphragm 1, an outer seal part 7 is configured. Above the diaphragm 1, a diaphragm piece 3 is mounted. Outside the annular valve seat 2, the bottom part of the valve chamber 6 is annularly formed, and a circular outflow port 5 is open at one location to communicate a secondary flow path 18, 37.

Figure 3:
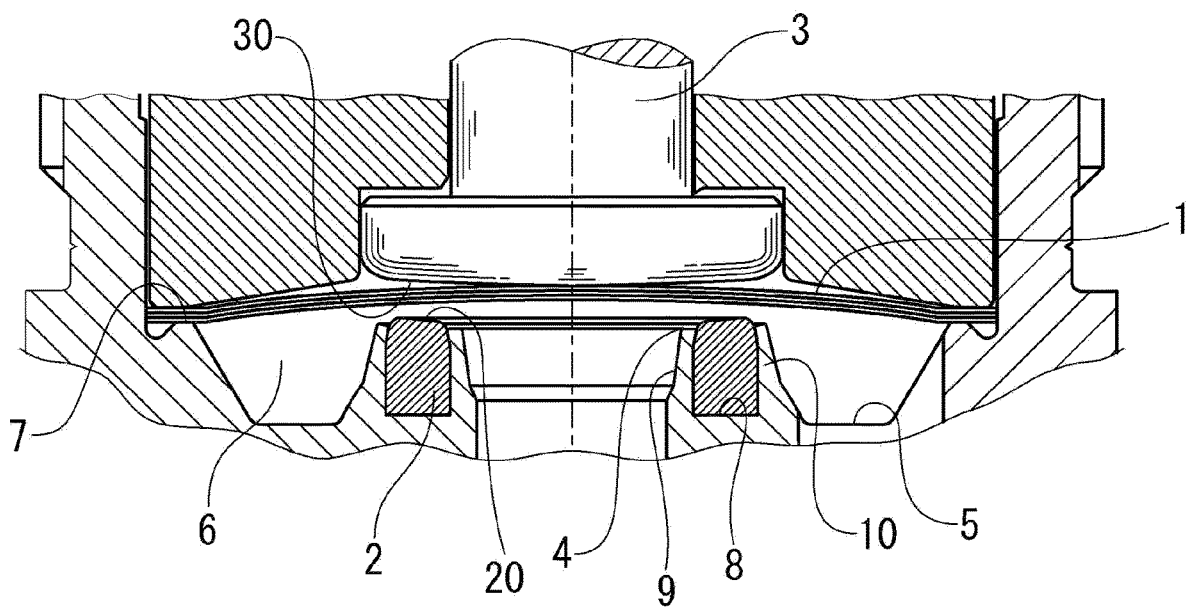
Figure 3:
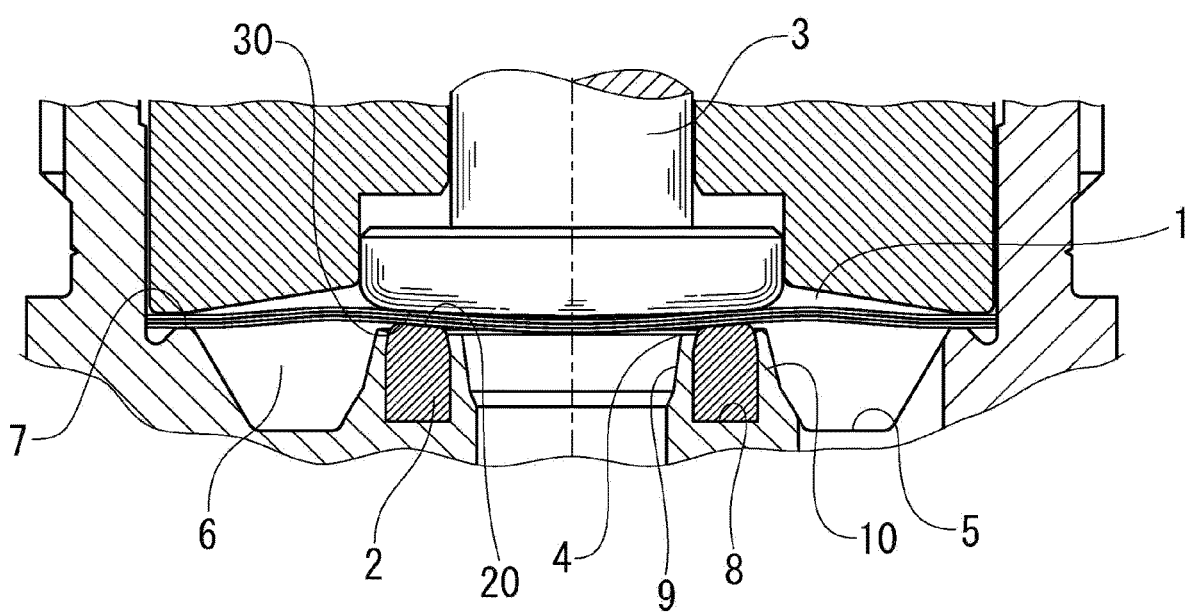
Figure 4:
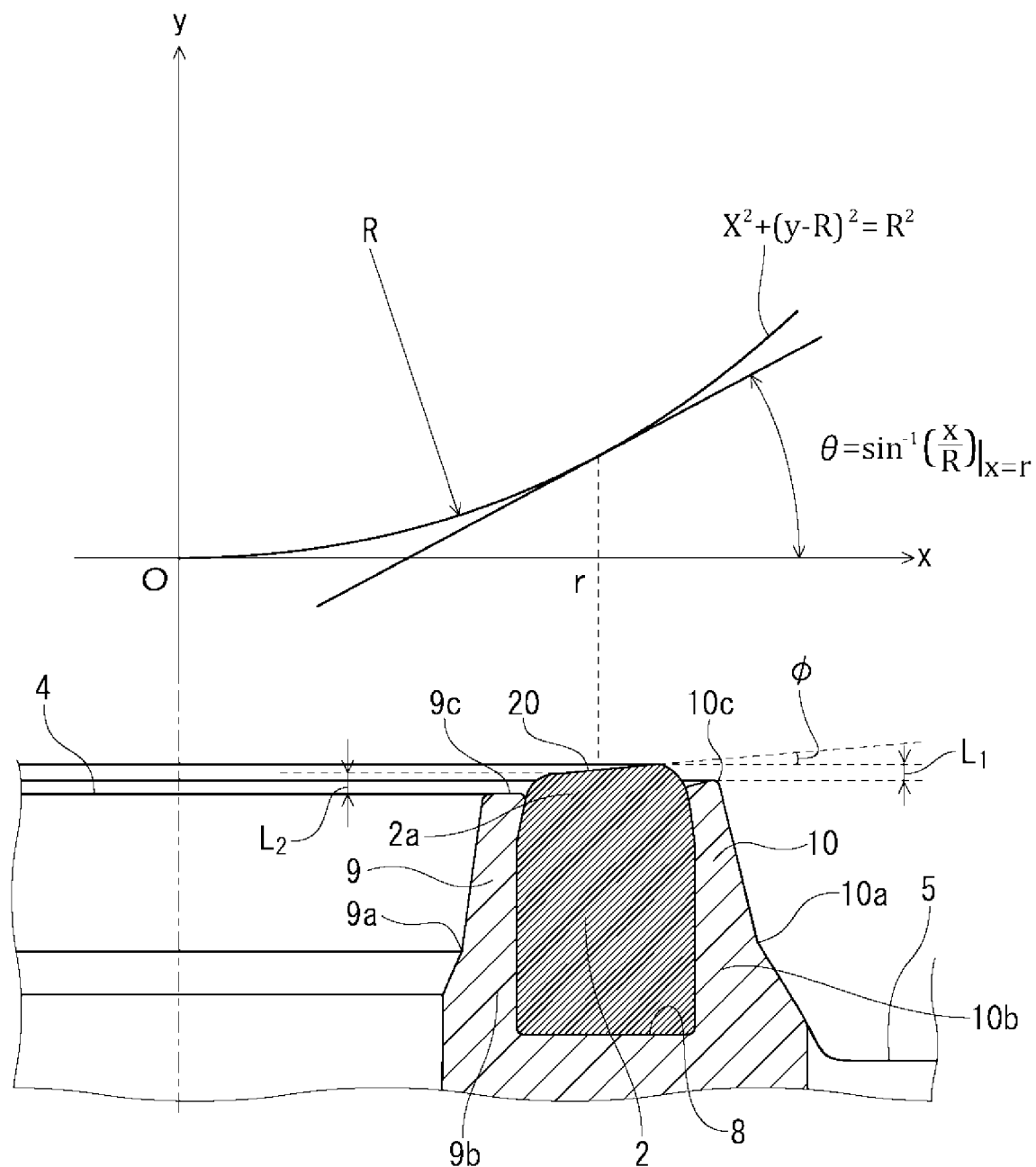
FIG. 4 is a schematic view of main parts with the annular valve seat of the present embodiment as being swaged and fixed inside the valve chamber of the valve depicted in an enlarged manner and also depicting a tilted angle φ of a contact surface together with a tilted angle θ of a tilted surface.
Figure 5:
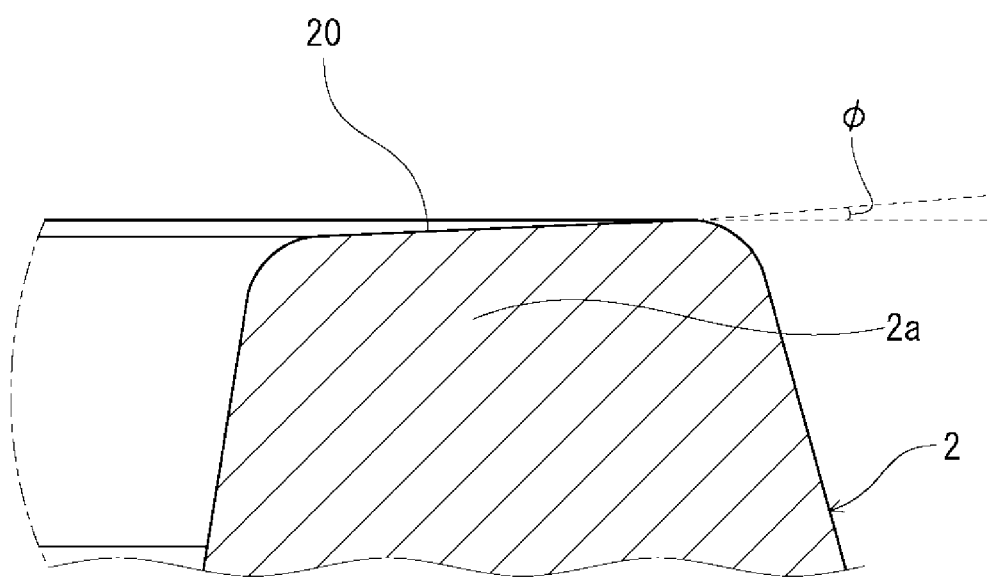
FIG. 5 is an enlarged sectional view of main parts with a head part of the annular valve seat of the present embodiment depicted in an enlarged manner.
Figure 6:
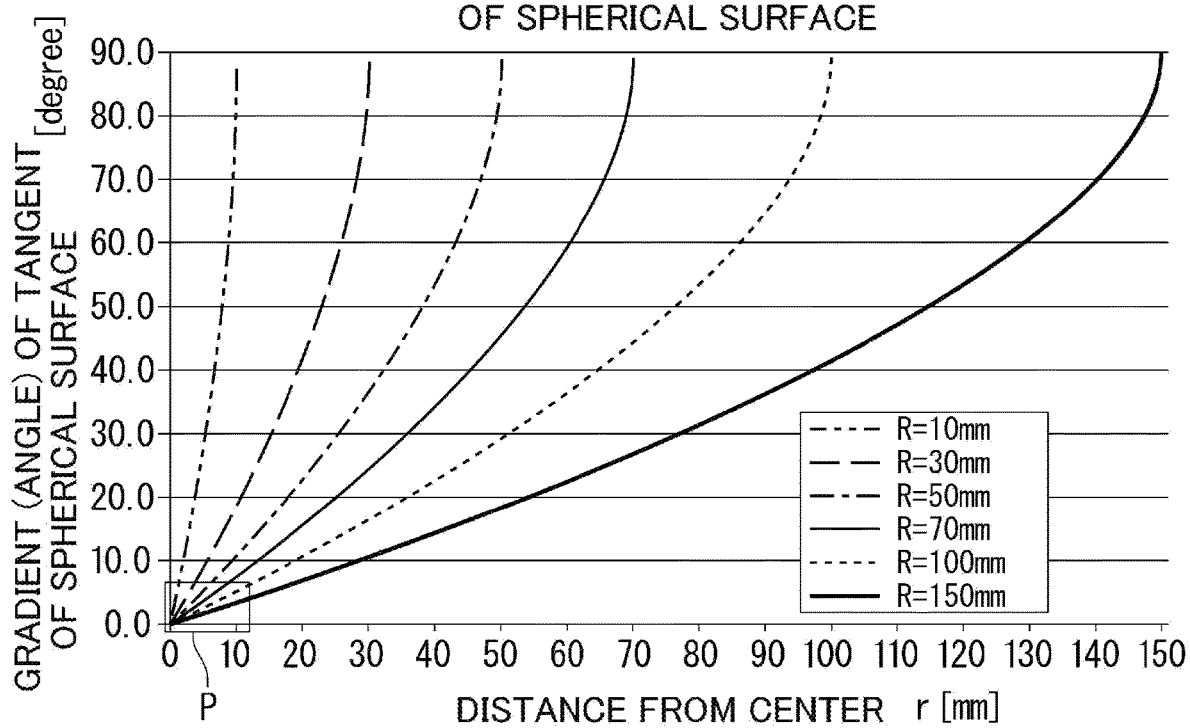
Figure 6:
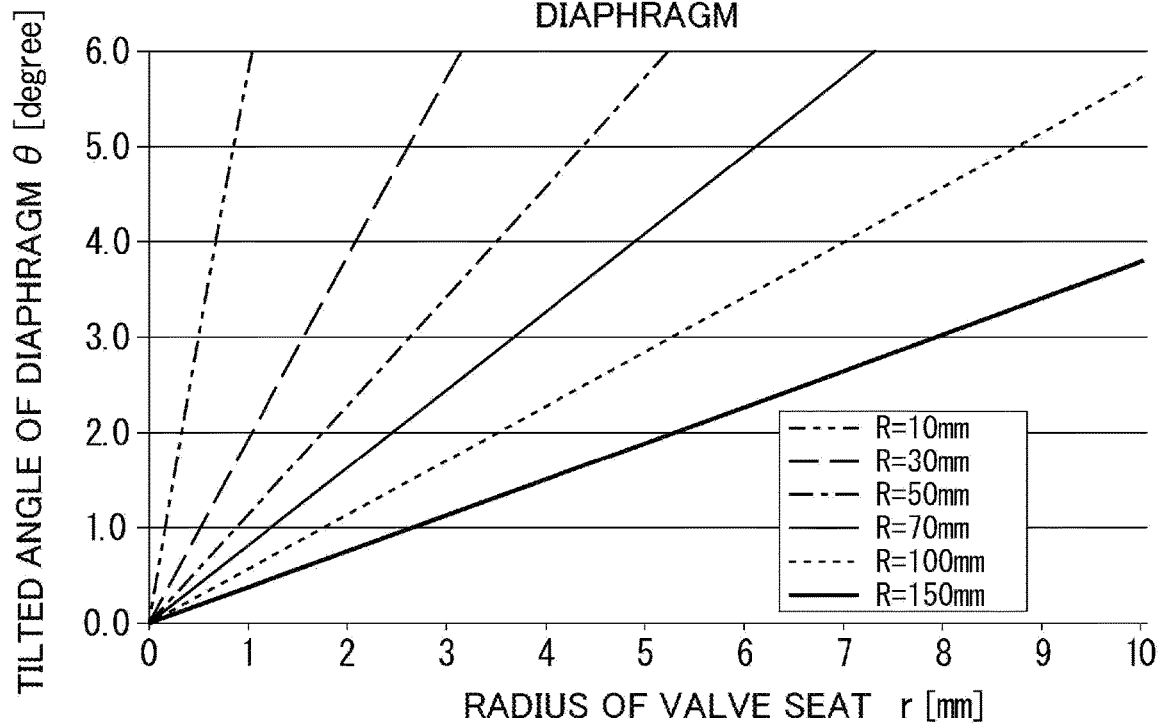

First, in FIG. 3 to FIG. 6, the structure of the valve chamber 6 when the valve of the present invention is in a use state, in particular, the structure of the annular valve seat 2 and the diaphragm piece 3 is described. As depicted in FIG. 3 to FIG. 5, a contact surface 20, which is an upper surface of the annular valve seat 2 of the present invention, has a tapered surface 20 formed along a centripetal direction of the annular valve seat 2.

FIG. 3A and FIG. B depict partially-enlarged sectional views of the valve chamber 6 of the valve of the present embodiment together with the annular valve seat 2, the diaphragm 1, and the diaphragm piece 3 depicted in an enlarged manner. FIG. 3A depicts a full-open state of the valve, and FIG. 3B depicts a full-closed state of the valve. Details of valve opening and closing in conjunction with the actuator will be described further below. In the valve of the present invention, as depicted in FIG. 3A and FIG. 3B, the diaphragm piece 3 moves in conjunction with an ascending/descending motion of the rod 12, 40, and the diaphragm as being tightly attached by a lower surface 30 of the diaphragm piece 3 can be pressed to fit the tapered surface 20.

Specifically, the tapered surface 20 has a tilted angle $\phi$ equal to or smaller by substantially 0.5 to 1 degree than a tilted angle $\theta$ of a tilted surface 30 formed on the lower surface 30 of the diaphragm piece 3, and the tilted angle $\phi$ of the tapered surface is set at substantially 3 degrees.

FIG. 4 is a schematic view of main parts with the annular valve seat 2 of the present embodiment as being swaged and fixed inside the valve chamber 6 of the valve depicted in an enlarged manner and also depicting the tilted angle $\phi$ of the contact surface 20 together with the tilted angle $\theta$ of the tilted surface 30. A partially-enlarged sectional view of the annular valve seat 2 as being swaged and fixed inside the valve chamber 6 of the valve of the present embodiment is depicted on a lower side of FIG. 4. A predetermined graph is schematically depicted in an upper side of FIG. 4, together with x and y axes. These x and y axes are rendered so that the x axis is parallel to a plane defined by the circular inflow port 4 and the y axis matches the center axis (a one-dot-chain line in a vertical direction) of the cylindrical primary flow path provided to be bored in the vertical direction leading to the inflow port 4.

In FIG. 4, the upper surface of the annular valve seat 2 is the contact surface 20 in contact with or away from a lower surface side of the diaphragm 1 at the time of full-closing. This contact surface 20 is formed as the tapered surface 20 tilted, with the center axis indicated by the one-dot-chain line as a center, along its centripetal direction. In FIG. 4, the tilted angle with respect to the x-axis direction (horizontal direction) is taken as $\phi$.

In the valve of the present invention, the tilted angle $\phi$ of the contact surface 20 of the annular valve seat 2 is preferably derived as follows. In FIG. 4, on xy coordinates, a circle equation represented by $x^2+(y-R)^2=R^2$ is rendered, with a radius of R. This circle is schematically depicted so as to be approximated as a curved line of a cross section acquired by cutting, at a center-axis position, a curved surface protruding downward and corresponding to the lower surface 30 (tilted surface 30) of the diaphragm piece 3. That is, in this case, the lower surface 30 is approximated by part of a spherical surface having the radius (curvature) R. In this circle equation, when the equation is solved for y and then is differentiated by x, its differentiation coefficient equal to the tangent of the tilted angle $\theta$ of the tilted surface 30. Therefore, the following Equation 1 is acquired.

$$\frac{dy}{dx} = \frac{x}{\sqrt{R^2 - x^2}} = \tan\theta \qquad \text{[Equation 1]}$$

When the above Equation 1 is solved for $\theta$, the following equation 2 is acquired. The radius r of FIG. 4 is set as a reference position representing the radius of the annular valve seat 2. In the present embodiment, an intermediate position between the outer diameter and the inner diameter of the annular valve seat 2 (more specifically, the contact surface 20) is taken as the radius r of the annular valve seat 2 for calculation. However, any value can be set as appropriate as the radius r.

$$\theta = \tan^{-1}\frac{x}{\sqrt{R^2 - x^2}} = \sin^{-1}\frac{x}{R} \qquad \text{[Equation 2]}$$

FIG. 6A is a graph in which the above Equation 2 is rendered for several radiuses R. FIG. 6B is an enlarged graph with a P part depicted in FIG. 6A depicted in an enlarged manner. As depicted in FIG. 6A and FIG. 6B, it can be found that as the radius R increases, the gradient of the entire graph falls down. For example, when the radius R of the diaphragm piece 3 is on the order of 50 mm (corresponding to a one-dot-chain line in FIG. 6A and FIG. 6B), if a radius r of the annular valve seat 2 is on the order of 3 mm, the tilted angle θ is approximately 3.5 mm or smaller from the graph. Thus, the tilted angle φ of the contact surface 20 may be set at 3.5 mm or smaller, which is equal to this tilted angle θ. While the tilted angle may be set as φ=θ as described above, φ is set slightly smaller than θ (φ=θ−α, α>0) in the valve of the present embodiment.

Specifically, if θ is on the order of 3.5 degrees to 4.0 degrees, φ is preferably set on the order of 3 degrees (α=0.5 to 1.0). Here, also when φ=0 is set, it is possible to substantially ensure uniformity of a load on a seal surface applied to the contact surface 20 at the time of valve-closing and sealing. With this uniformization of seal surface pressure, deformation of the shape of the annular valve seat 2, in particular, a change in a height direction, can be reduced.

However, at the time of valve manufacture, accuracy of finishing of component products normally vary to some extent. Therefore, the tilted angle θ of the tilted surface 30 of the diaphragm piece 3 and the tilted angle φ of the annular valve seat 2 do not always match. In particular, when the angles θ and φ do not match, when the tilted surface 30 is closely attached to the contact surface 20 via the diaphragm 1 at the time of valve-closing and sealing, a surface pressure biased to either one of an outer diameter side and an inner diameter side of the contact surface 20 inevitably occurs. In particular, when the annular valve seat 2 is made of a soft member such as PFA, the biased surface pressure tends to deform the annular valve seat 2 in a biased and distorted shape after opening and closing so many times at extremely high speed under a high-temperature environment. In particular, the shape in height is changed, thereby possibly directly influencing and fluctuating the Cv value.

By contrast, if the tilted angle φ is set slightly smaller than θ, irrespective of variations of accuracy of finishing of the component products, the tilted surface 30 is always closely attached to the contact surface 20 from the inner diameter side to the outer diameter side at the time of valve-closing and sealing. Here, since an angular difference α between φ and θ is subtle, the entire seal surface, that is, close attachment from the inner diameter side to the outer diameter side, has almost no time difference. Furthermore, compared with the case in which φ is larger than θ, the outer diameter side of the contact surface 20 is not first pressed and deformed. Therefore, the outer diameter side with a cross section thinner than that of the inner diameter side is not first crushed, and the amount of deformation of the annular valve seat 2 can be decreased.

Thus, together with uniformization of the seal surface pressure the mechanism of the seal surface pressure can be uniformized to be always in a constant manner irrespective of variations of accuracy of finishing of the component products. Thus, shape deformation of the annular valve seat 2 is uniformized and stabilized, and fluctuations of the flow-path opening area is also stabilized, thereby contributing to stabilization of Cv value fluctuations. The above case poses no problem if the angular difference a is on the order of 0.5 to 1.0 even if slight nonuniformity of the surface pressure occurs, and this can be said within a range of not impairing uniformity of the seal surface pressure. From this reason, in the present embodiment, the angle φ is set slightly smaller than the angle θ.

Furthermore, in the valve of the present embodiment, since the tilted surface 30 and the contact surface 20 are both tilted surface parts. Therefore, sealability at the time of valve closing and opening/closing responsivity are extremely favorable. Still further, since a large distortion or deformation of the annular valve seat 2 is hard to occur to and, in particular, local stress concentration is hard to occur. Therefore, degradation is hard to occur, and durability of the valve is also improved. Similarly, since the seal surface is a tilted surface part, the seal area is increased compared with the case of a flat surface. Thus, with the same pressure force (spring 23, 44), the seal surface pressure is decreased, and thus deformation in shape and the amount of crush of the annular valve seat 2 are reduced even with the same seal force. This is further advantageous for achieving both of durability of the valve and Cv value stability.

As described above, in the present invention, in accordance with at least the tilted angle θ of the annular portion (tilted surface 30) of the lower surface 30 of the diaphragm piece 3 opposed to and separated from the annular valve seat 2, the tilted angle φ of the contact surface 20 (tapered surface 20) of the annular valve seat 2 is optimally set so as to achieve the above-described effects. Thus, even after the valve is opened and closed many times at high speeds under a high-temperature environment, high uniformization of the seal surface pressure can be kept, thereby always uniformly distributing the load by the pressure force over the entire surface. Thus, distortion or deformation of the annular valve seat 2 is hard to occur. In particular, as will be described further below by using FIG. 8, the amount of crush in the height direction is effectively reduced and, as a result, Cv value fluctuations of the valve can be reduced. While the lower surface 30 of the diaphragm piece 3 is taken as a curved surface from which θ can be easily derived and part of the spherical surface is selected in FIG. 4, a more general curved surface (such as a curved surface with higher approximation accuracy with the lower surface 30) may be used for approximation to derive the tilted angle θ in accordance with implementation situations (such as a use condition, object, and effect of the valve) and, in accordance with the derived tilted angle θ, the tilted angle φ may be set as appropriate.

Furthermore, with the contact surface 20 of the annular valve seat 2 being tilted, although not depicted, the amount of thermal expansion in the height direction with respect to that at ordinary temperatures can also be decreased, compared with a conventional annular valve seat having a rectangular cross section and having a contact surface formed in a flat (horizontal) shape at the same height (material thickness) as that of an outermost diameter portion of the cross section of the contact surface 20. The reason for this is thought to be as follows. Since the cross-sectional area of the annular valve seat 2 is decreased by the formed tapered surface 20, influences of thermal expansion is reduced at least by that amount of this member, and a dimensional difference (a difference in height between ordinary temperatures and high temperatures) due to thermal expansion is reduced. In view of this, if the cross-sectional shape of the annular valve seat 2 is a flat cross-sectional shape with at least the dimension in the height direction being decreased, the amount of deformation due to thermal expansion in the height direction can also be reduced even under a high-temperature environment. Therefore, this is preferable for reducing Cv value fluctuations of the valve at ordinary temperatures and high temperatures.

Also, in FIG. 3 and FIG. 4, the annular valve seat 2 is made of resin (PFA), and fixedly attached to the attachment groove part 8 by swaging and fixing. Also, a base part of each of the swaging parts 9 and 10 of the present embodiment is formed to have a slightly large material thickness. In FIG. 4, the swaging parts includes the swaging part 9 on the inner diameter side of the attachment groove part 8 and the swaging part 10 on the outer diameter side thereof. In a valve assembling process, after the annular valve seat 2 is attached to the attachment groove part 9, these swaging parts 9 and 10 are swaged and deformed each by a predetermined jig or the like to cause the annular valve seat 2 to be fixedly attached inside the valve chamber 6.

In FIG. 4, base parts 9b and 10b of the swaging parts 9 and 10 are each formed to be thin on an upper side and be slightly thick on a lower side on FIG. 4, with starting points 9a and 10a, respectively, each as a boundary. Thus, the base parts 9b and 10b are each easily bent and deformed by swaging deformation to an annular valve seat 2 side, with these starting points 9a and 10a each as a starting point. In this manner, by providing the starting points 9a and 10a for forming the thick base parts 9b and 10b each at an appropriate position, the position of swaging deformation can be adjusted. Thus, for example, if a swaging jig does not descend accurately straight or the swaging pressure is not appropriate due to some reason, risks can be decreased such that swaging deformation and/or bending occurs from an inappropriate position as a starting point to disable appropriate swaging and fixing.

Figure 7:
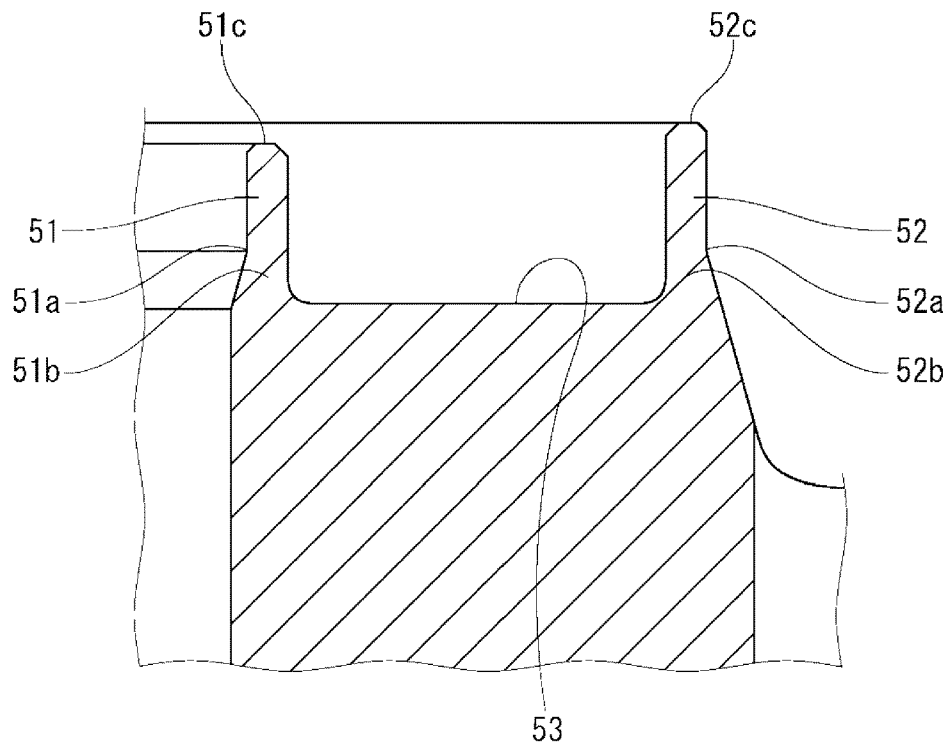
FIG. 7 is an enlarged sectional view of main parts with another example of structure of a swaging part of the present invention depicted in an enlarged manner.

FIG. 7 depicts another example of structure of the swaging part, and is a partially-enlarged sectional view of the swaging part depicted in an enlarged manner before the annular valve seat of the present invention is attached to an attachment groove part 53. Also in FIG. 7, a swaging part 51 on an inner diameter side and a swaging part 52 on an outer diameter side are provided with starting points 51a and 52a, respectively, from which base parts 51b and 52b, respectively, become thick. Specifically, when a height from the bottom part of the attachment groove part 53 to an upper end 51c of the swaging part 51 on the inner diameter side is taken as 1 and a height from the bottom part to an upper end 52c of the swaging part 52 on the outer diameter side is taken as 1.1, the height to the starting points 51a and 52a is set each at approximately 0.3.

Also in the present invention, when the annular valve seat 2 is swaged and fixed, a protrusion margin length L of a head part 2a of the annular valve seat 2 protruding from the upper end 9c, 10c, 51c, 52c of the swaging part 9, 10, 51, 52 is minimized. In FIG. 4, a length $L_1$ is a length in a height direction (in an axial center direction of the valve) between the upper end 10c of the swaging part 10 on the outer diameter side and an end of the contact surface 20 on the outer diameter side, and a length $L_2$ is a length in the height direction between the upper end 9c of the swaging part 9 on the inner diameter side and an end of the contact surface 20 on the inner diameter side. Also, Table 1 below is a comparison table in which the protrusion margin lengths $L_1$ and $L_2$ in the valve of the present embodiment and first to eighth comparative examples are compared. The protrusion margin lengths $L_1$ and $L_2$ in every valve after the annular valve seat had been swaged and fixed to the attachment groove part under ordinary temperatures were each measured on a design drawing (CAD). In the first to eighth comparative examples, each product has an approximately same size (diameter of the annular valve seat) as that of the valve of the present embodiment.

TABLE 1

| VALVE TYPE | OUTSIDE PROTRUSION MARGIN LENGTH L1 | INSIDE PROTRUSION MARGIN LENGTH L2 |
|---|---|---|
| VALVE OF PRESENT EMBODIMENT (SIZE: ½) | ORDER OF 0.17 mm | ORDER OF 0.20 mm |
| VALVE OF PRESENT EMBODIMENT (SIZE: ¼) | ORDER OF 0.20 mm | ORDER OF 0.22 mm |
| FIRST COMPARATIVE EXAMPLE | ORDER OF 0.50 mm | ORDER OF 0.58 mm |
| SECOND COMPARATIVE EXAMPLE | ORDER OF 0.45 mm | ORDER OF 0.40 mm |
| THIRD COMPARATIVE EXAMPLE | ORDER OF 0.48 mm | ORDER OF 0.48 mm |
| FOURTH COMPARATIVE EXAMPLE | ORDER OF 0.53 mm | ORDER OF 0.50 mm |
| FIFTH COMPARATIVE EXAMPLE | ORDER OF 0.50 mm | ORDER OF 0.45 mm |
| SIXTH COMPARATIVE EXAMPLE | ORDER OF 0.30 mm | ORDER OF 0.30 mm |
| SEVENTH COMPARATIVE EXAMPLE | ORDER OF 0.36 mm | ORDER OF 0.36 mm |
| EIGHTH COMPARATIVE EXAMPLE | ORDER OF 0.50 mm | ORDER OF 0.40 mm |

As depicted in Table 1, the protrusion margin length of the valve of the present embodiment is on the order of approximately 0.20 mm irrespective of whether the protrusion is inside or outside. By contrast, in the comparative examples, the protrusion margin length is longer than the above, on the order of approximately 0.30 mm to 0.50 mm. In the valve products of the present embodiment, the protrusion margin length is shorter than the conventional products.

In FIG. 3 and FIG. 4, minimizing the protrusion margin lengths $L_1$ and $L_2$ on the outside and inside means that each component of the valve is designed so that, the protrusion margin lengths $L_1$ and $L_2$ are decreased as much as possible in accordance with the size, structure, use condition, or the like of the valve, with the annular valve seat 20 being swaged and fixed to the swaging parts 9 and 10, to a such an extent that, when the upper surface of the diaphragm 1 is pressurized by the lower surface 30 of the diaphragm piece 3 to cause the lower surface of the diaphragm 1 to press-fit to the contact surface 20 of the annular valve seat 2 to close the valve, valve performance is prevented from degradation because the diaphragm 1 makes contact with the upper ends 9c and 10c of the inner and outer swaging parts 9 and 10 during a substantial use life of the valve. Specifically, for the valve of the present embodiment, the range of the protrusion margin length L is preferably 0.05 mm to 0.20 mm.

Also, in the above-described valve of the present embodiment, heat annealing, which will be described further below, was performed in advance before valve opening/closing, and then valve opening/closing was repeated ten million times while the Cv value of the valve is measured under an environment at ordinary temperatures. Then, the protrusion margin lengths $L_1$ and $L_2$ were actually measured. The length $L_1$ was on the order of 0.07 mm to 0.08 mm, and the length $L_2$ was on the order of 0.05 mm to 0.07 mm. Also, fluctuations of the Cv value of the valve during that time were hardly measured.

The reason for this is believed as follows. Since heat annealing makes the shape of the annular valve seat 20 sufficiently fit to the valve-closing state by pressurization from the diaphragm piece 3, the inner and outer protrusion margin lengths L of size ½ and size ¼ are each substantially on the order of 0.20 mm as described above. However, these valve seats are each crushed to a magnitude substantially on the order of 0.10 mm. Thereafter, the protrusion margin length L is hardly changed even if the valve is opened and closed, and is kept to be substantially on the order of 0.07 mm (0.05 mm to 0.08 mm) even after opening/closing ten million times.

Thus, as described above, by combining minimization of the protrusion margin length L as much as possible and heat annealing before the start of use, changes of the annular valve seat 20 in the height direction can be extremely reduced with respect to the valve opening/closing mechanism enormously many times, at least at a ten-million-time level. That is, it has been demonstrated that this is quite effective to reduce Cv value fluctuations of the valve. It can be believed that, although influences by thermal expansion can be thought, the present embodiment is effective when the valve is used with a fluid or under an environment at high temperatures such as 200 degrees Celsius in manner similar to that under ordinary temperatures as described.

In FIG. 4, according to, for example, a difference between coefficients of linear expansion of the respective materials of the attachment groove part 8 (body 14, 32) and the annular valve seat 2, if the outer diameter of the attachment groove part 8 and the outer diameter of the annular valve seat 2 are equal at ordinary temperatures, when these components are heated at 200 degrees Celsius, it can be predicted that the outer diameter of the annular valve seat 2 expands more than the outer diameter of the attachment groove part 8. Therefore, when both of the outer diameters are the same, at ordinary temperatures and these components are heated at 200 degrees Celsius, the annular valve seat 2 extends in a radial direction. This expansion margin expanding in the radial direction serves as the amount of distortion (expansion margin) in a thrust direction due to compression deformation due to constraint by the attachment groove part 8, the annular valve seat 2 is significantly changed in the height direction and this change may become a factor in significantly fluctuating the valve Cv value. Thus, while the outer diameter of the annular valve seat 2 is designed to be smaller than the outer diameter of the attachment groove part 8 under ordinary temperatures, this diameter reduction is designed to be further smaller in the case of a normal valve, thereby reducing pressure and ascent of the annular valve seat 2 due to thermal expansion.

Next, each structure of the valve of the present embodiment is described. FIG. 1 depicts one example of structure of the valve of the present embodiment. FIG. 2 depicts another example of structure of the valve of the present embodiment. In both drawings, via a diaphragm 1, the annular valve seat 2 and the diaphragm piece 3 of the present embodiment described above are provided inside the valve chamber 6, and the valve is in a full-open state. Also, both structures have actuator main bodies 11 and 33, respectively, for operating the diaphragm 1. These actuator main body 11 and 33 have rods 12 and 40, respectively, for opening and closing the diaphragm 1 via the diaphragm piece 3 by reciprocating movements and pistons 13, and 34 and 35, respectively, for operating the rods 12 and 40, respectively, by receiving an air pressure. The rod 12 and the piston 13 are coupled via a predetermined seal material, and the rod 40 and the pistons 34 and 35 are coupled via a predetermined seal material.

FIG. 1 depicts an example of structure of an automatic valve in which a piston is provided with a one-step actuator in the present embodiment. In FIG. 1, the actuator main body 11 includes one piston 13 inside, and this actuator main body 11 is provided to the body 14.

In FIG. 1, the body 14 is a machined part made of SUS 316 L. The primary flow path 15 in a horizontal direction is bent to a vertical direction to lead to the inflow port 4 to communicate to the inside of the valve chamber 6. To the attachment groove part 8 provided to the peripheral edge part of the opening of the inflow port 4, the annular valve seat 2 is swaged and fixed. On its outer peripheral side, a recessed space is annularly provided to define the capacity of the valve chamber 6. On its outer peripheral side, the outer seal part 7 for tightly attaching the diaphragm 1 is provided to protrude so as to have a substantially trapezoidal cross section. An upper side of this valve chamber 6 is formed in a cylindrical shape where the outer periphery of a cylindrical bonnet 16 can fit. On its outer peripheral side, a male screw part to be screwed to a female screw part of a base body 17 is provided. Also, the outflow port 5 is open on the bottom of the valve chamber 6 to vertically lead to the secondary flow path 18 in the horizontal direction.

In FIG. 1, the base body 17 is made of SUS 304. On a lower inner peripheral surface, the female screw part is provided and can be screwed to the body 14. On an upper inner peripheral side, a male screw part is provided and can be screwed to a female screw part of the cylinder 19. Also, a hole part 17a is provided at the center, which the rod 12 can penetrate through and fit in.

In FIG. 1, the bonnet 16 is made of SUS 304, and has an outer peripheral surface formed in a substantially columnar shape. A through hole in a predetermined shape is formed at the center, with an upper side which the rod 12 can fit in and a lower side which the diaphragm piece 3 can fit in. Also, a lower surface side as being assembled in the valve has a substantially tapered surface along the centripetal direction so as to fit to the swelling shape of the diaphragm 1. With the female screw part and the male screw part of the base body 17 being screwed, an upper surface side is pushed from the base body 17 toward a valve chamber 6 side. Thus, this outer peripheral side of the lower surface is pressurized by the outer seal part 7 provided to protrude to the outer periphery of the valve chamber 6 as tightly attaching the outer periphery of the diaphragm 1, thereby allowing the diaphragm 1 tightly attached and fixed inside the valve chamber 6.

In FIG. 1, the diaphragm 1 is made of a Co alloy, and a required number of sheets are laminated for use. In a natural state, the diaphragm 1 has an oval counter-sunk shape formed of a mild convex curved surface, and can be returned to this natural shape by self-resiliency even if a center part is deformed to be recessed within a predetermined range. As being assembled in the valve, the diaphragm 1 has an outer periphery vertically pressurized as the outer seal part 7 and fixed inside the valve chamber 6. Above the diaphragm 1, the diaphragm piece 3 is provided in a loosely fit manner.

In FIG. 1, the diaphragm piece 3 is made of SUS 304, and has a substantially umbrella shape as a whole formed of a cylindrical part and a flange part. As being assembled in the valve, the cylindrical part is on an upper side and the flange part is on a lower side, and the diaphragm piece 3 fits in to be fixed to a lower side of the through hole of the bonnet 16 in a loosely fit state so as to be able to make an ascending/descending motion. The flange part has an outer surface (lower surface 30) formed in a convex curved surface shape symmetrical with respect to the axial center as described below.

In FIG. 3A and FIG. 3B, the lower surface 30 of the diaphragm piece 3 is a mildly curved surface protruding downward in FIG. 3A and FIG. 3B. As depicted in FIG. 3B, the tilted surface 30 as a portion opposed to the contact surface 20 when pressurized by the annular valve seat 2 via the diaphragm 1 at least at the time of valve closing is formed in a tapered surface or a curved surface with the tilted angle θ formed in accordance with the tilted angle φ formed on the contact surface 20 (tapered surface 20). In particular, in FIG. 4, at least this tilted surface 30 portion is approximated as part of a perfect circle (spherical surface). A specific relation between the angles φ and θ has been described above. Other than the above-described relativity, these angles can be set as appropriate in accordance with implementation.

In FIG. 1, the actuator main body 11 is provided above the body 14, and can be automatically operated as appropriate pneumatically by using a predetermined control device.

The cylinder (cover) 19 has a substantially cylindrical outer appearance, and is provided with a connecting part at an axial center position connectable to an air supply source not depicted and a female screw part on its depth side where an adjusting screw 21 can be screwed. The adjusting screw 21 is a work of a set screw of a flat-point type made of SUS 304, and is provided for adjusting the Cv value of the valve, as will be described further below. The cylinder 19 has aluminum as a base material, and the female screw part may be subjected to predetermined reinforcement (such as E-Sert insertion) so that the threads are not crushed due to screwing of a male screw part of the adjusting screw 21. Also, subsequently to this female screw part, a shaft insertion part 22 penetrates, in which the upper part of the rod 12 can fit so as to make an ascending/descending motion.

In FIG. 1, a compression spring 23 is coaxially accommodated inside the cylinder 19, and is provided so that one end can spring back toward the cylinder 19 and the other end can spring back toward the piston 13. The spring 23 of the present embodiment is made of SUS 631 J1 in consideration of durability at high temperatures, springing back to the diaphragm 1 via the piston 13 to close the valve and being compressed by a thrust of the piston 13 by an air pressure to an air chamber 24 to open the valve. Therefore, as necessary basic performance, as being assembled inside the actuator main body 11 and compressed to a set length (initial deflection length), the spring 23 is required to have a load with a magnitude which allows the valve to be sufficiently closed by deforming and tightly attaching the diaphragm 1 to the annular valve seat 2 even if a fluid pressure acts. At the same time, the load is required to be designed for a length (total deflection length) when the spring 23 is compressed to have a length causing the valve to be fully opened so that the load is smaller than an ascending thrust of the piston 13 with air supply to the actuator main body 11. Furthermore, the spring 23 of the present embodiment has an inner diameter decreased as much as possible so that a force acting in the axial center direction is generated at a position near the axial center and a force acting in a direction of tilting the piston 13 is decreased as much as possible.

In the valve of the present embodiment, as for designing the load of the spring 23, since the seal surface (contact surface 20) of the valve is the tilted tapered surface 20, if this seal load is set so as to be equal to the seal surface pressure of a conventional valve having a flat seal surface (that is, if the seal surface is set slightly larger by the influence of the tapered surface), the amount of crush (the amount of deformation) of the annular valve seat 2 becomes at the same degree, and effects by the tapered surface 20 may not be achieved. The area of the seal surface is preferably calculated simply based on a difference (thickness) between the inner and outer diameters of the annular valve seat 2 to calculate a load, and the load setting of the spring 23 is changed if a problem or the like occurs in an element test or the like thereafter to solve the problem.

Also as described above, in the valve of the present embodiment, the rod 12 and the piston 13 are not in an integrated structure but each have a separate structure and are assembled mutually via the seal material. In FIG. 1, the rod 12 is provided with an O ring 27 on an upper side of the cylindrical shape, and fits inside the shaft insertion part 22 of the cylinder 19 so as to be able to make an ascending/descending motion, with sealing being kept with respect to the inner peripheral surface of the shaft insertion part 22. With an upper end surface of the rod 12 capable of making contact with a lower end of the adjusting screw 21, a top dead center is defined by the adjusting screw 21. This allows an ascending/descending motion stroke, that is, a valve stroke, of the rod 12 to be directly adjustable by the amount of screwing of the adjusting screw 21.

Also, a main flow path of an air flow path 12a communicates to the axial center of the rod 12 in the vertical direction. Via an air flow path provided to the adjusting screw 21, air from the air supply source not depicted and connected to the connecting part can pass through and can be supplied and discharged. Air can be supplied to the air chamber 24 via a branch path of the air flow path 12a communicating in a horizontal direction at a middle part of the rod 12. A lower side of the rod 12 fits in the hole part 17a of the base body 17 via an O ring 25 so as to be able to make an ascending/descending motion. With a lower end surface of the rod 12 capable of making contact with an upper end surface of the diaphragm piece 3, the diaphragm piece 3 can be pushed down by the descent of the rod 12 as deforming the diaphragm 1 to a recessed shape to make the diaphragm 1 closely attached to the annular valve seat 2, thereby allowing the valve to be closed. Furthermore, to improve wear resistance, the rod 12 is subjected to a predetermined hard anodizing process. The rod 12 preferably has a long one-piece structure as much as possible to enhance straightness.

In FIG. 1, the piston 13 is integrally formed in a substantially disk shape having an attachment hole 13a at the center. In this attachment hole 13, an O ring 26 at a middle portion of the rod 12 fits at its provided position. At the time of assembling, a flange part 12b of the rod 12 and a step part provided to the attachment hole 13a are engaged together, and then a split ring 29 is attached to the rod 12 via a retaining ring 28 above the piston 13. Thus, the piston 13 is vertically sandwiched and fixed to be positioned with respect to the rod 12 in a non-slidable manner. This makes the rod 12 and the piston 13 fixedly attached integrally. However, since the rod 12 and the piston 13 are separate bodies via the O ring 26, both can rock while keeping sealability, in accordance with a difference between the outer diameter of the rod 12 and the inner diameter of the attachment hole 13a, elasticity of the O ring 26, and so forth.

The outer peripheral side of the piston 13 is formed in a substantially columnar shape, is provided with an O ring 31, and can vertically slide while keeping sealability with respect to the cylindrical inner peripheral surface of the cylinder 19. Also, one air chamber 24 is formed between the lower surface side of the piston 13 and the base body 17.

The ascending/descending motion members (the rod 12 and the piston 13) require high coaxiality as a whole. As in the above-described structure, the shaft component (rod 12) and the thrust generating component (piston 13) are made separate and are coupled together via an elastic O ring, thereby preventing dependency on coaxiality due to accuracy of finishing. This can flexibly address a deforming action in a direction other than a thrust direction occurring from eccentricity derived from a combination of processing errors on the inner peripheral surface of the cylinder 19 and so forth.

In the valve of the present embodiment, the rod 12 and the piston 13 are in a separate structure via the O ring 26. Thus, an imbalance of the load of the spring 23 received by the piston 13, an imbalance of resistance occurring due to sliding of the O ring 31 in contact with the cylinder 19 and, furthermore, an axial deviation due to processing error or assembling error can be appropriately absorbed by the interposed O rings 26 and 31. Therefore, the rod 12 itself can proceed straight forward without receiving the influence of the piston 13, thereby preventing stress of the O rings 26 and 31 and uneven wear thereof.

The groove parts provided to the rod 12 and the piston 13 and to which the O rings 25, 26, 27, and 31 are attached are each formed to have a groove width appropriately larger than a standard groove width at ordinary temperatures, in consideration of expansion at a high temperature of 200 degrees Celsius as well as a use location, a sliding direction, and so forth. Furthermore, the material of these O rings is appropriately selected from heat-resistant materials. Also, appropriate grease coating is performed on these O rings.

On the other hand, FIG. 2 depicts an example of the structure of an automatic valve in which pistons are provided with a two-step actuator. In FIG. 2, an actuator main body 33 includes two pistons 34 and 35 inside, and this actuator main body 33 is provided to an upper part of a body 32.

In FIG. 2, in the body 32, the primary flow path 36 provided to be bored in a vertical direction communicates to the inside of the valve chamber 6 via the inflow port 4. From the inside of the valve chamber 6, the body 32 leads to the secondary flow path 37 provided to be bored in the vertical direction via the outflow port 5. Also, an upper of this valve chamber 6 is formed in a cylindrical shape where the outer periphery of a bonnet 38 can fit. On its inner peripheral surface of a further upper part, a female screw part that can be screwed to a base body 39 is provided. The inner structure of the valve chamber 6 and the structure of the diaphragm 1 and the diaphragm piece 3 of the valve of FIG. 2 are similar to those described in the valve of FIG. 1.

In FIG. 2, the base body 39 is a machined part made of SUS 304. On an upper outer peripheral surface, a male screw part is provided which can be screwed to a female screw part of a casing. On a lower outer peripheral surface, a male screw part is provided which can be screwed to a female screw part of the body 32. A hole part 39a is provided at the center, which a lower part of the rod 40 can penetrate through and fit in.

In FIG. 2, the bonnet 38 is made of SUS 304, and is formed of a flange part 38a and a cylindrical part to be in a substantially umbrella shape as a whole. The flange part 38a has an outer peripheral surface formed in a substantially short columnar shape so as to be able to fit to the upper side of the valve chamber 6. A through hole in a predetermined shape is formed at the center, with an upper side which a lower part of the rod 40 can fit in and a lower side which the diaphragm piece 3 can fit in. Also, a surface side of the flange part 38a of the bonnet 38 is a lower surface side as being assembled in the valve and has a substantially tapered surface along the centripetal direction so as to fit to the swelling shape of the diaphragm 1. With the female screw part and the male screw part of the base body 39 being screwed, a convex part 38b annularly formed along the outer periphery on the underside of the flange part 38a makes contact with a lower end surface of the base body 39 and is pushed toward the valve chamber 6. Thus, this outer peripheral side of the lower surface is pressurized by the outer seal part 7 provided to protrude to the outer periphery of the valve chamber 6 as tightly attaching the outer periphery of the diaphragm 1, thereby allowing the diaphragm 1 tightly attached and fixed inside the valve chamber 6.

In FIG. 2, the actuator main body 33 is provided above the body 32, and can be automatically operated pneumatically under predetermined control. A cylinder (cover) 41 has a structure substantially similar to that of the cylinder 19 depicted in FIG. 1, is provided with a connecting part, an adjusting screw 42, a shaft insertion part 43, and a spring 44 inside. On a lower outer peripheral surface, a male screw part that can be screwed to the female screw of an upper part of a casing 45 is provided. The casing 45 is subjected to predetermined hard anodizing process, has its outer periphery formed in a substantially columnar shape, and is bonded between the base body 39 and the cylinder 41 via a screw part to configure part of a housing of the actuator main body 33. Also, a hole part is provided at the center at a position on the inner peripheral surface where an O ring 46 is provided. In the hole part, the outer peripheral surface of a diameter-expanded part formed in the middle of the rod 40 can fit.

In FIG. 2, the rod 40 is provided with an O ring 47 on an upper side of the cylindrical shape, and fits inside the shaft insertion part 43 of the cylinder 41 so as to be able to make an ascending/descending motion, with sealing being kept with respect to the inner peripheral surface of the shaft insertion part 43. With an upper end surface of the rod 40 capable of making contact with a lower end of the adjusting screw 42, a top dead center is defined by the adjusting screw 42. This allows an ascending/descending motion stroke, that is, a valve stroke, of the rod 40 to be directly adjustable by the amount of screwing of the adjusting screw 42.

In FIG. 2, a main flow path of an air flow path 40a communicates to the axial center of the rod 40 in the vertical direction. Via an air flow path provided to the adjusting screw 42, air from the air supply source not depicted and connected to the connecting part can pass through and can be supplied and discharged. Air can be supplied to each of two air chambers 48 and 49 via two branch paths of the air flow path 40a communicating in a lateral direction of the rod 40. A lower side of the rod 40 fits in the hole part 39a of the base body 39 via an O ring 50 so as to be able to make an ascending/descending motion. With a lower end surface of the rod 40 capable of making contact with an upper end surface of the diaphragm piece 3, the diaphragm piece 3 can be pushed down by the descent of the rod 40 as deforming the diaphragm 1 to a recessed shape to make the diaphragm 1 closely attached to the annular valve seat 2, thereby allowing the valve to be closed. Furthermore, to improve wear resistance, the rod 40 is subjected to a predetermined hard anodizing process. The rod 40 preferably has a long one-piece structure as much as possible to enhance straightness.

In FIG. 1, the two pistons 34 and 35 are each integrally formed in a substantially disk shape having attachment holes 34a and 35b, respectively, at the center. In these attachment holes 34a and 35a, O rings 54 and 55, respectively, of the rod 40 fit at their provided positions. On an outer diameter side, O rings 56 and 57 are provided so as to be able to slide while keeping sealability on the inner peripheral surface of the cylindrical casing 45 and the inner peripheral surface of the base body 39. Therefore, internal pressure in the air chambers 48 and 49 formed on a lower side of the pistons 34 and 35, respectively, is not impaired. Also, the diameter-expanded part is formed in the middle of the rod 40, and step-like engaging parts 40b and 40c are formed at upper and lower end parts of this diameter-enlarged part. An upper surface side of the upper piston 35 is always resiliently pressed downward from another end as a lower side of the spring 44. A inner diameter side of a lower surface is engaged with the engaging part 40b and is therefore always pressurized and fixed by the spring 44 toward the engaging part 40b. This makes the piston 35 positionally fixed to the rod 40, and both of the piston 35 and the rod 40 always integrally move in conjunction with each other.

On the other hand, in the lower piston 34, as depicted in FIG. 1, only an ascending motion by air pressure at the time of air filling is locked to the engaging part 40c, and is not positionally fixed to the rod 40. However, the piston 34 has an outer diameter side sealed by the O ring 56 and an inner diameter side sealed by the O ring 54, and makes an ascending/descending motion in a range of keeping seal-ability of these. Therefore, the internal pressure of the air chamber 48 is not impaired.

As described above, with the rod 40 and the pistons 34 and 35 configured as being separate, effects similar to those of the separate structure of the rod 12 and the piston 13 described above in FIG. 1 can be acquired. Also, unlike the one-step actuator depicted in FIG. 1, in the two-step actuator of FIG. 2, the rod 40 and the two pistons 34 and 35 are not required to move completely in conjunction with each other (the two pistons are not required to be positioned and and fixed to the rod 40). As depicted in FIG. 2, even if the pistons 34 and 35 are configured so as to be able to slide in a certain range relatively to the rod 40, this configuration suffices if sealability is always kept between the pistons and the rod in a valve use state and the internal pressure of the air chamber is not impaired.

Next, the mechanism of the valve of the present embodiment is described. FIG. 1, FIG. 2, and FIG. 3A each depict a full-open state of the valve of the present embodiment. In the following, the valves of FIG. 1 and FIG. 2 are commonly described.

In this full-open state, air filling to the air chamber 24, 48, 49 is completed. By internal pressure of the air chamber, the piston 13, 34, 35 ascends with a predetermined thrust against the pressing force of the spring 23, 44 and the upper end of the rod 12, 40 bumps against the lower end of the adjusting screw 21, 42 to ascend to the top dead center (upper-limit position of the valve stroke). Thus, the lower end surface of the rod 12, 40 also ascends to the upper-limit position, and the upper end surface of the diaphragm piece 3 is free and is lifted by self-resiliency of the diaphragm 1. The shape of the diaphragm 1 is returned to be a natural shape, and thereby causing the valve to be in a full-open state. As will be described further below, by setting the upper-limit position of the rod 12, 40 to a position lower than a maximum stroke position (the position of the top dead center) by screwing adjustment (stroke adjustment) of the adjusting screw 21, 42, extremely effective reduction of Cv value fluctuations can be achieved, while the maximum flow rate is decreased to some extent.

In the full-open state, when air is purged from the air chamber 24, 48, 49 via the air flow path 12a, 40a, the resilient force of the spring 23, 44 becomes stronger accordingly to push down the piston 13, 34, 35 to decrease the capacity of the air chamber 24, 48, 49. Accordingly, the rod 12, 40 is also pushed down. That is, in FIG. 1, the step part of the piston 13 is engaged with the flange part 12b to transmit the force of the spring 23 to push down the rod 12.

In FIG. 2, engagement with the engaging part 40b of the piston 35 transmits the force of the spring 44 to push down the rod 40. Accordingly, the lower end surface of the rod 12, 40 bumps against and pushes down the upper end surface of the diaphragm piece 3, and this pushing force overcomes the counterforce from the fluid to push down the diaphragm piece 3, thereby deforming the center of the diaphragm 1 in a recessed shape. Finally, with tilted surface 30 press-fitting to the contact surface 20 via the diaphragm 1, the valve becomes in a full-closed state. This full-closed state is depicted in FIG. 3B.

A method of assembling the valve of the present invention is described next. In the present invention, the valve is assembled with the components of the valve subjected to a heating treatment at a temperature higher than ordinary temperatures. As the temperature higher than ordinary temperatures, for example, a temperature of substantially 80 degrees Celsius is selected.

The diaphragm valve of the present embodiment is assumed to be used as being submerged at high temperatures on the order of 200 degrees Celsius (in a hot bath), and therefore tends to be more influenced by thermal expansion of members, compared with products to ordinary-temperature specifications. Thus, by assembling the valve under an environment at a temperature higher than ordinary temperatures, that is, a temperature as close as possible to a use temperature, a difference from the use environment temperature can be decreased, compared with the case in which the valve is normally assembled at ordinary temperatures. Thus, components can be mutually assembled as being compatible in advance with the use temperature, and therefore deformation and so forth due to thermal expansion are hard to occur. In particular, deformation, distortion, and so forth of a flow path shape defined for each component are hard to occur under a high-temperature environment, resulting in a contribution to stabilization of Cv value fluctuations of the valve and also expectation of an improvement in strength and durability of the valve. Furthermore, since particles are moved away from the components due to thermophoresis, particles are hardly attached to the components, and this is preferable also in view of cleanliness. Still further, while an ideal valve assembling temperature is 200 degrees Celsius for the valve of the present embodiment because it is optimal to assemble the valve at a maximum use temperature for the valve, the valve is preferably assembled, in practice, at a temperature on the order of 80 degrees Celsius on the assumption of human operation.

Any means for assembling the valve as the temperature of the components is kept higher than ordinary temperatures can be selected in accordance with implementation. One example of practical means simply carried out through manual operation by an operator can take the following processes. That is, a valve component group is mounted on a hot plate and is heated and left for a predetermined reference time when the component group entirely becomes at a temperature on the order of 80 degrees Celsius, and then the operator assembles the components one by one by manual operation by wearing a heat-resistant glove or the like. The hot plate is a workbench having a predetermined heating device incorporated therein. As another heating device, a lamp heater provided above the bench may be used for irradiation and heating. Furthermore, a coating cover, an airstream generation device, or the like may be combined, and/or the heating position may be limited. These measures can improve heating and working efficiency.

In particular, in a valve of the above-described type, as for the diaphragm 1, regarding a swelling height (height with respect to the outer peripheral portion at the center) of a natural shape of the diaphragm 1 as being assembled in the valve at ordinary temperatures (as being tightly attached to the outer seal part 7) after the valve is exposed to an environment at 200 degrees Celsius, the inner diameter side of the disk-shaped diaphragm 1, which tends to receive heat influences, attempts to thermally expand substantially uniformly in a radial direction, and thus the center tends to have a tension. Furthermore, it revealed that the height resultantly falls by approximately 5% based on the influences of thermal expansion of a member such as the outer seal part 7.

By contrast, in the valve of the present embodiment assembled by setting a temperature environment for the assembling process at a temperature on the order of 80 degrees as described above, the members such as the diaphragm 1, the outer seal part 7, and so forth already have been thermally expanded in advance in a predetermined manner under the environment at 80 degrees Celsius. Therefore, in the valve assembled in this state, in particular, the diaphragm 1 and the outer seal part 7, influences by thermal expansion have been effectively decreased. Actually, it has been revealed that even after the valve of the present embodiment is exposed to an environment at 200 degrees Celsius, the swelling height of the natural shape of the diaphragm 1 is approximately 3% to 4% with respect to that at ordinary temperatures, that is, compared with the swelling height when the diaphragm is once cooled down in an environment at ordinary temperatures after being assembled. It has been demonstrated that a change between the time of assembling and the time of use, in particular, a change in the flow-path opening area, can be further decreased, in contrast to products assembled at ordinary temperatures.

One example of how to assemble the valve of the present embodiment depicted in FIG. 2 is as follows. That is, when the actuator main body 33 is assembled, E-Sert is first inserted into the cylinder 41 to attach the adjusting screw 42, and also the spring 44 is inserted. Next, the O rings 56 and 57 are attached to the outer periphery of the two pistons 34 and 35, the O rings 50 and 54 are attached to the lower part of the rod 40, and the piston 34 is assembled to the lower part. Next, the lower part of the rod 40 is inserted into the hole part 39a of the base body 39, and the O ring 46 is inserted into the hole part at the center of the casing 45. Through this hole part of the casing 45, the diameter-expanded part of the rod 40 passes to be screwed to the base body 39.

Next, the O rings 47 and 55 are attached to the upper part of the rod 40 to assemble the piston 35, to which the cylinder 41 is screwed, thereby completing assembling. Also, when the body 32 is assembled, the diaphragm 1 is mounted above the valve chamber 6 of the body 32 with the annular valve seat 3 swaged and fixed to the attachment groove part 8, and then the bonnet 38 with the diaphragm piece 3 attached thereto is appropriately inserted above this valve chamber 6. Then, the male screw part of the base body 39 of the assembled actuator main body 33 is appropriately screwed to the female screw part of the body 32, thereby appropriately configuring the outer seal part 7 for sealing the valve chamber 6. Thus, assembling the valve depicted in FIG. 2 is completed.

Also, after assembling of the valve of the present embodiment, a valve adaptation (conforming) process is performed in advance before the start of use. In the present embodiment, the valve after completion of assembling is subjected to annealing for a predetermined time at a predetermined temperature in a valve-closed state. For example, in the valve of the present embodiment, with the valve closed by a predetermined valve-closing force in accordance with the use conditions, annealing is performed for a predetermined time under an environment at 230 degrees Celsius. The annular valve seat 2 in an initial state is in a no-load state, and is therefore in a state of being most likely to be crushed by a pressurizing load of valve-closing operation in the entire lifetime, that is, in a state of being deformed in shape (in particular, height). Therefore, if it is shipped as it is, a large amount of shape deformation occurs due to valve opening/closing, and large Cv value fluctuations tend to occur.

By contrast, through the above-described adaptation process, the shape of the annular valve seat 2 appropriately becomes compatible, and can be made in a stable state against a pressurizing load, resulting in a contribution to stabilization of Cv value fluctuations. In particular, in the present invention, the tapered surface at the tilted angle φ is formed on the contact surface 20 in accordance with the tilted surface 30 (tilted angle θ) of the diaphragm piece 3. Therefore, also in the adaptation process, a surface pressure with high uniformity acts on the seal surface, and thus the adaptation effect (shape stabilization effect) can be further enhanced, compared with conventional valves of this type.

Finally, changes in characteristics in a state of using the valve of the present invention are described. Firstly, in the valve of the present embodiment, as for changes in characteristic at ordinary temperatures and 200 degrees Celsius, it is achieved that the amount of falling of the diaphragm 1 is within 0.12 mm and a difference in Cv values is within 0.15.

First, in the valve of the present embodiment, before the start of use, by adjusting the amount of screwing the adjusting screw 21, 42 against which the upper end of the rod 12, 40 making an ascending/descending motion bumps, the top dead center of the upper end of the rod 12, 40, that is, the upper-limit position of the valve stroke, is lowered below a maximum position corresponding to a maximum swelling height of the diaphragm 1 (stroke adjustment), thereby adjusting the Cv value of the valve. This is individual difference adjustment for solving a valve's individual difference to allow uniform Cv values to be ensured irrespective of the individual. For example, when the Cv value of the valve at 200 degrees Celsius is designed to be on the order of 0.6 to 0.7, this stroke adjustment can reduce the Cv value to a value on the order of 0.5. This adjustment can solve, with high accuracy, a difference between Cv values of the valve at ordinary temperatures and 200 degrees Celsius to, for example, within ±5%, irrespective of variations of individual differences. Also, the diaphragm 1 is prevented from being deformed with a maximum width, and durability of the diaphragm 1 is also improved. This stroke adjustment can also bring a difference between Cv values of the valve at ordinary temperatures and 200 degrees Celsius to, for example, 0.15 or lower, preferably 0.12 or lower.

As for Cv value stability, the valve of the present embodiment is assumed to be operated many times at high temperatures as high as 200 degrees Celsius. Also, the temperature is not limited to 200 degrees Celsius, and the valve has to be able to operate in various temperature ranges from ordinary temperatures to 200 degrees Celsius, depending on the user use conditions. In this valve, in addition to high durability, operation stability is necessary. Specifically, a characteristic is required in which Cv value fluctuations are as less as possible during operation.

By contrast, in the valve of the present invention, with the effects of the tilted surface 30 of the diaphragm piece 3 and the contact surface 20 (tapered surface 20) of the annular valve seat 2, uniformization of the seal surface pressure and also a reduction in the amount of shape deformation of the annular valve seat 2 are achieved, compared with a conventional valve of this type.

Figure 8:
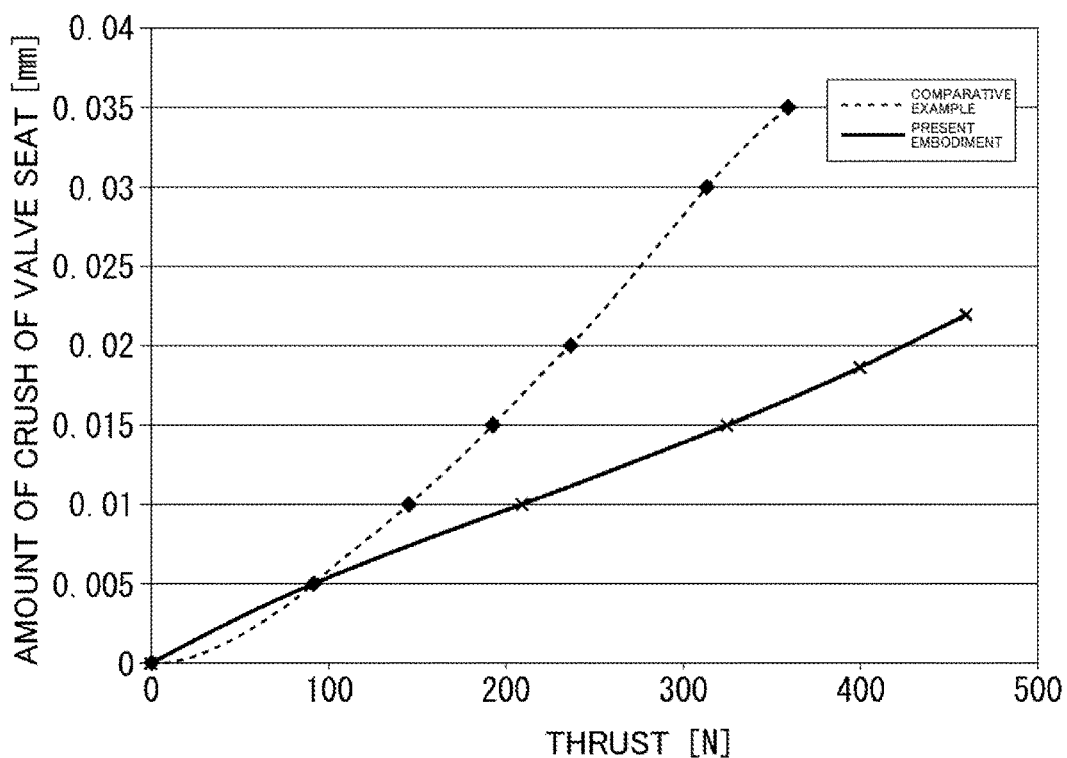
FIG. 8 is a graph with measured crush amounts of the annular valve seat of of the valve of the present embodiment.

FIG. 8 is a graph with measured valve-seat crush amounts of the annular valve seat 2 as a result of experiment results demonstrating this reduction in the amount of shape deformation. In an experiment depicted in FIG. 8, under an environment at ordinary temperatures, the diaphragm 1 is mounted on the body 32 having the annular valve seat 2 swaged and fixed thereto. The diaphragm 1 is pressurized by the diaphragm piece 3, with the use of a predetermined instrument (load cell) that can measure a pressurizing thrust from above. Then, several measurement values of a load (N) of this load cell and the amount (mm) of crush of the annular valve seat 2 are plotted on the graph. A curve (solid line) represents a polynomial approximation curve (regression analysis). Also in FIG. 8, plots and a curve (dotted line) are depicted as one example (a comparative example) in which a conventional annular valve seat having a flat contact surface is prepared and similar measurements are performed.

As depicted in FIG. 8, in the annular valve seat 2 of the present invention, even with a thrust on the order of 400 N (equivalent to a thrust by the actuator main body 11, 33 actually pressurizing the annular valve seat 2 in the valve of the present embodiment), the valve seat is merely crushed to the extent of not exceeding 0.02 mm, and high resistance has been demonstrated against shape deformation due to reception by the contact surface 20 (tapered surface 20) of pressurization from the diaphragm piece 3. Furthermore, in the structure of the comparative example, the annular valve seat swaged and fixed in advance and then subjected to the above-described predetermined adaptation (conforming) process is used, and is therefore resistant to crush deformation, to some extent. The amount of crush in the present embodiment is significantly smaller than that of the comparative example. Thus, the annular valve seat 2 of the valve of the present embodiment is highly resistant to crush against a valve-closing force (in particular, in a height direction).

Although not depicted, the experiment data in FIG. 8 is under an environment at ordinary temperatures and, for example, when the annular valve seat 2 is made of resin such as PFA, the hardness of the material is considerably softened at high temperatures such as 200 degrees Celsius. Therefore, if the same experiment of FIG. 8 is performed under a high-temperature environment, it is assumed that the absolute amount of crush is considerably increased compared with the case of FIG. 8. If conditions other than the material, temperature conditions, and so forth are the same, it can be assumed that a relative relation with the conventional example (a relation in which the amount of crush is decreased) is the same and, rather, the difference is widened. Therefore, the annular valve seat 2 of the valve of the present embodiment can be expected to be highly resistant to crush against the valve-closing force under an environment at high temperatures such as 200 degrees Celsius in a manner similar to that under an environment at ordinary temperatures.

Figure 9:
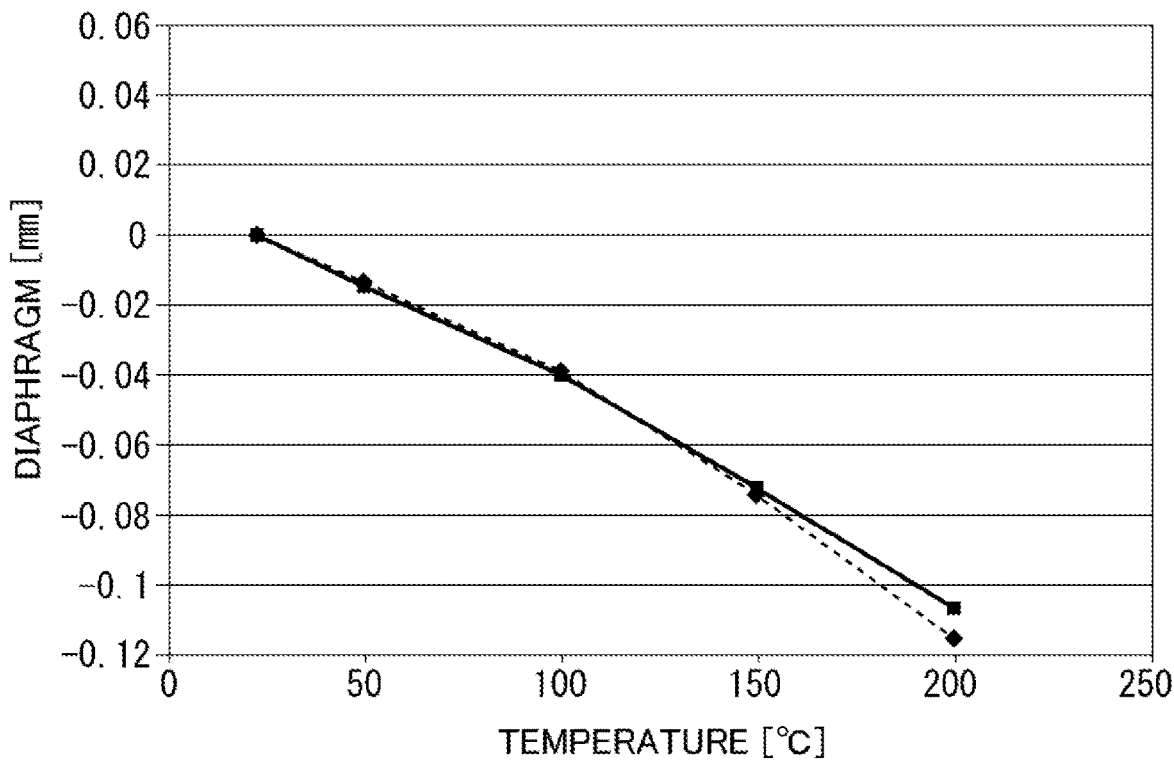
FIG. 9 is a graph with measured amounts of falling of a diaphragm of the valve of the present embodiment.

FIG. 9 is a graph plotted with the amounts of falling of the diaphragm 1 for comparison between ordinary temperatures and high temperatures by heating in the valve of the present embodiment depicted in FIG. 2. In an experiment depicted in FIG. 9, a predetermined number of sheets of the diaphragm 1 were stacked on the body 32 and swaged to configure the outer seal part 7. First, at ordinary temperatures, as a height of the center of the diaphragm 1 swelling in a natural shape, a distance from the bottom of the body 32 was measured. Next, the body 32 in this state was placed on a hot plate and heated to 200 degrees Celsius and, with this state being kept, the height of the center of the diaphragm 1 was similarly measured. The height of the center was similarly measured also at temperatures in the course of heating to 200 degrees Celsius (50 degrees Celsius, 100 degrees Celsius, and 150 degrees Celsius). In FIG. 9, these measured heights are plotted, with an increase in temperature on the horizontal axis. A solid line in FIG. 9 represents data of a sample subjected in advance to the above-described annealing and then adaptation, and a dotted line represents data of a sample without being subjected to annealing.

As depicted in FIG. 9, in the valve of the present embodiment, it can be found that the amount of falling of the diaphragm 1 from ordinary temperatures to 200 degrees Celsius is small within 0.12 mm. This amount of falling is directly related to fluctuations of the opening area of the flow path, is thus a factor directly influencing Cv value fluctuations of the valve, and is therefore preferably more decreased. Therefore, the amount of falling is more preferably within 0.10 mm. Also, the amount of falling of the diaphragm 1 within 0.12 mm is considerably small for conventional valves of this type. As a factor allowing such a decrease, for example, performing the above-described valve assembling process under a high-temperature (reducing the swelling height of the diaphragm 1) can be thought.

Figure 10:
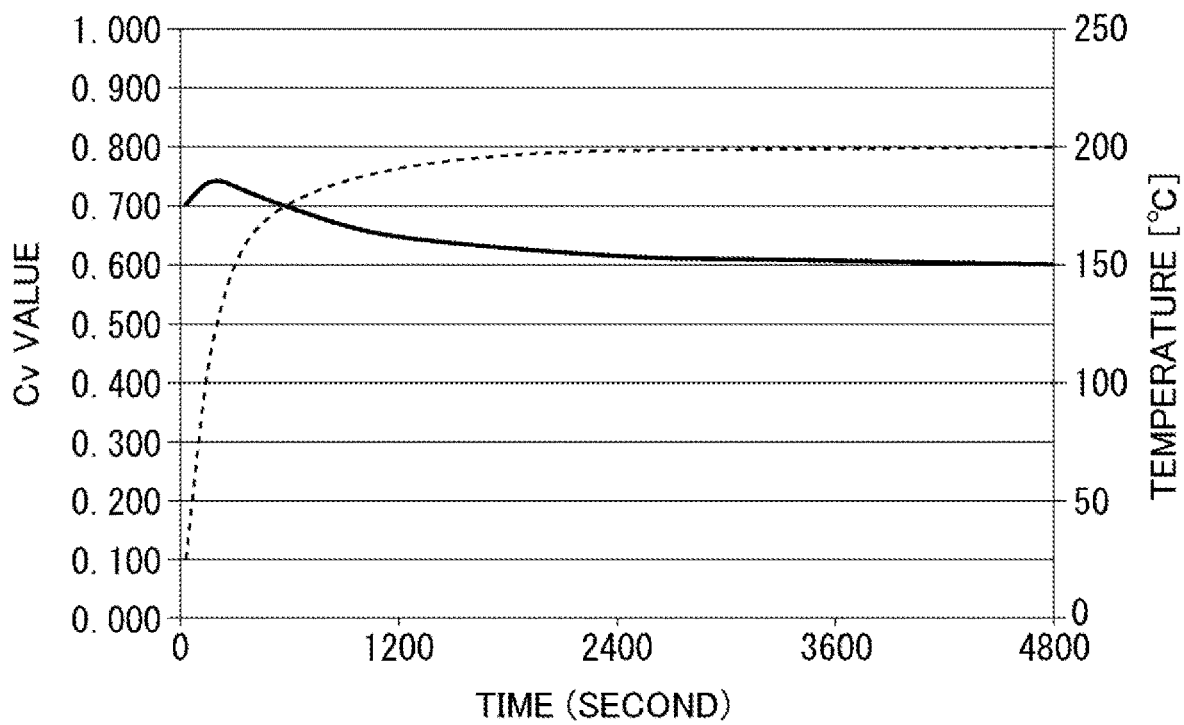
FIG. 10 is a graph with measured fluctuations of a Cv value of the valve of the present embodiment (with respect to heating time)

FIG. 10 depicts an example of a graph with measured changes of the Cv value of the valve with time and changes in temperature by heating in the valve of the present embodiment depicted in FIG. 2, with a valve body heating time plotted on the horizontal axis. In an experiment depicted in FIG. 10, a generally-defined equation is used as an equation for calculating a Cv value. In this experiment, calculation is made based on the following Equation 3 defined when the fluid is gas. Although experiment measurements are not performed, it goes without saying that calculation can be performed by using the generally-defined equation when the fluid is fresh water. Also, the Cv value of the valve of the present embodiment is based on the structure inside the valve chamber 6 broadly depicted in FIG. 3. Therefore, it can be thought that similar results can be acquired for the valve depicted in FIG. 1.

$$Cv = \frac{q}{4.17 P_1} \sqrt{\frac{SgT}{\Delta P / P_1}} \qquad \text{[Equation 3]}$$

Also, in these experiment measurements, a predetermined heating jig (for heating the body 32) is held and fixed to the body 32, a predetermined mass flowmeter (for measuring a flow rate q [Nm$^3$/hr]) and a heat exchanger (for gas heating) are directly coupled to a downstream side of the primary flow path outside the body 32, and predetermined differential pressure measurement devices (for measuring a pressure $\Delta P$ [kPa] inside the primary flow path 36 and inside the secondary flow path 37 and an absolute pressure $P_1$ [kPa] inside the primary flow path 36) are each connected to the nearest locations of the primary flow path and the secondary flow path outside the body, thereby configuring a test line. Sg is a specific gravity of gas (nitrogen gas: 0.97 [g/cm$^3$]), and a temperature T [K] is measured by a thermocouple fixed to an exit of the primary flow path 36 of the body 32.

In these experimental measurements, firstly, the valve of the present embodiment is fixed to the heating jig on the test line configured as described above so as to allow gas to pass through the line. Then, the valve is opened to let a predetermined amount of nitrogen gas at ordinary temperatures pass therethrough. Next, after the measurement pressure $\Delta P$ and $P_1$ become stable, the heat exchanger and the heating jig are powered on to start heating nitrogen gas. Also, measurements for respective data (q, $\Delta P$, $P_1$, and T) and calculation of Cv values are started. Then, the valve is left stand until the measurement temperature T indicates stable 200 degrees Celsius (approximately one hour). FIG. 10 represents changes of the measured and calculated Cv values with time and heating temperatures of the body 32 at the time of measurement. As depicted in FIG. 10, in the valve of the present embodiment, it can be found that a difference between the Cv values at ordinary temperatures and 200 degrees Celsius being equal to or smaller than 0.15 is achieved. Also, the time until the body and the plumbing are sufficiently heated to be stabilized at high temperatures varies depending on the plumbing shape, capacity, the flow rate of the fluid, and so forth. In the present embodiment, it can be found that it takes at least one hour (3,600 seconds) or so until the temperature reaches 200 degrees Celsius for stabilization.

Furthermore, in the valve of the present embodiment, while the valve is opened and closed under a high-temperature environment (for example, 200 degrees Celsius) from 0 to ten million times, the range of fluctuations of the Cv value of the valve is kept within 10% with respect to the initial Cv value. The reasons for this can be the small amount of falling of the diaphragm 1 as described above and, in addition, the tapered surface 20 formed on the annular valve seat 2 contributes to the above. As described above, since this tapered surface 20 makes the annular valve seat 2 highly resistant to deformation against pressurization from the diaphragm piece 3, even after valve opening/closing is repeated many times, the amount of deformation is small, and fluctuations of the sectional area of the flow path are hard to occur, thereby contributing to stabilization of the Cv value of the valve.

The valve used in the above-described experiment measurement is a valve adjusted in advance by adjusting the valve stroke by the adjusting screw described above so that the Cv value of the valve under an environment at 200 degrees Celsius is 0.6. As depicted in FIG. 10, in a short time period immediately after the start of measurements, a peak can be observed where the Cv value is slightly increased. In a long time period thereafter, in particular, in a region where the heating temperature is stable, it can be found that the Cv value is stabilized.

FIG. 11A and FIG. 11B depict graphs with measured changes of the Cv value of the valve with time under an environment at 200 degrees Celsius (in a state in which a high-temperature fluid at 200 degrees Celsius is let flow) compared with a conventionally-structured valve, with the number of times of opening/closing the valve on the horizontal axis. A method of measuring a Cv value is similar to the measurement method described with reference to FIG. 10. In FIG. 11A and FIG. 11B, first and second products of the present invention represent data acquired from two samples each prepared with the valve of the present embodiment and manufactured under the same conditions. A conventional product represents reference data acquired from one example of a conventionally-structured valve of a type similar to that of the valve of the present embodiment. FIG. 11A is a graph of an actual number of times of opening/closing (horizontal axis: 0 to ten million times) and Cv values (vertical axis: 0.40 to 0.60), and FIG. 11B is a graph with a rate of change from the initial Cv value on the vertical axis.

Figure 11:
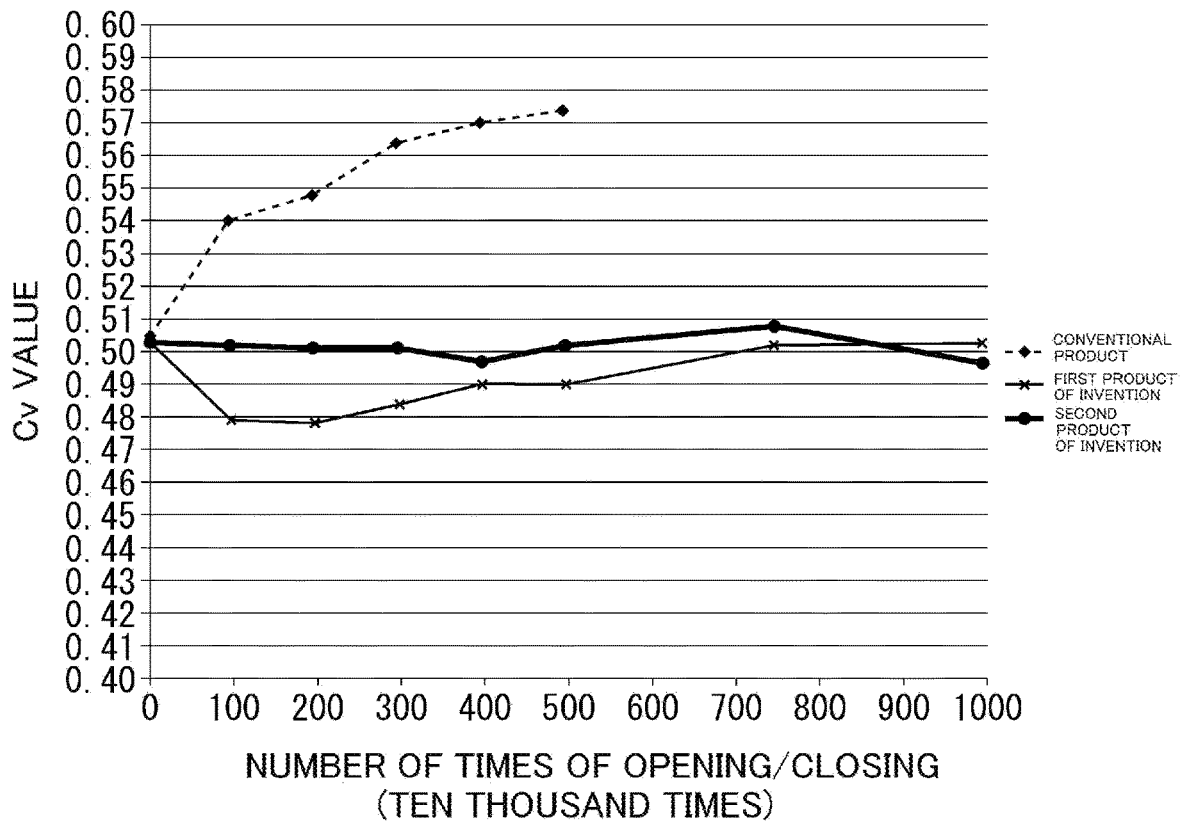
FIG. 11A and FIG. 11B are graphs with measured fluctuations of the Cv value of the valve of the present embodiment (with respect to the number of times of opening/closing).
Figure 11:
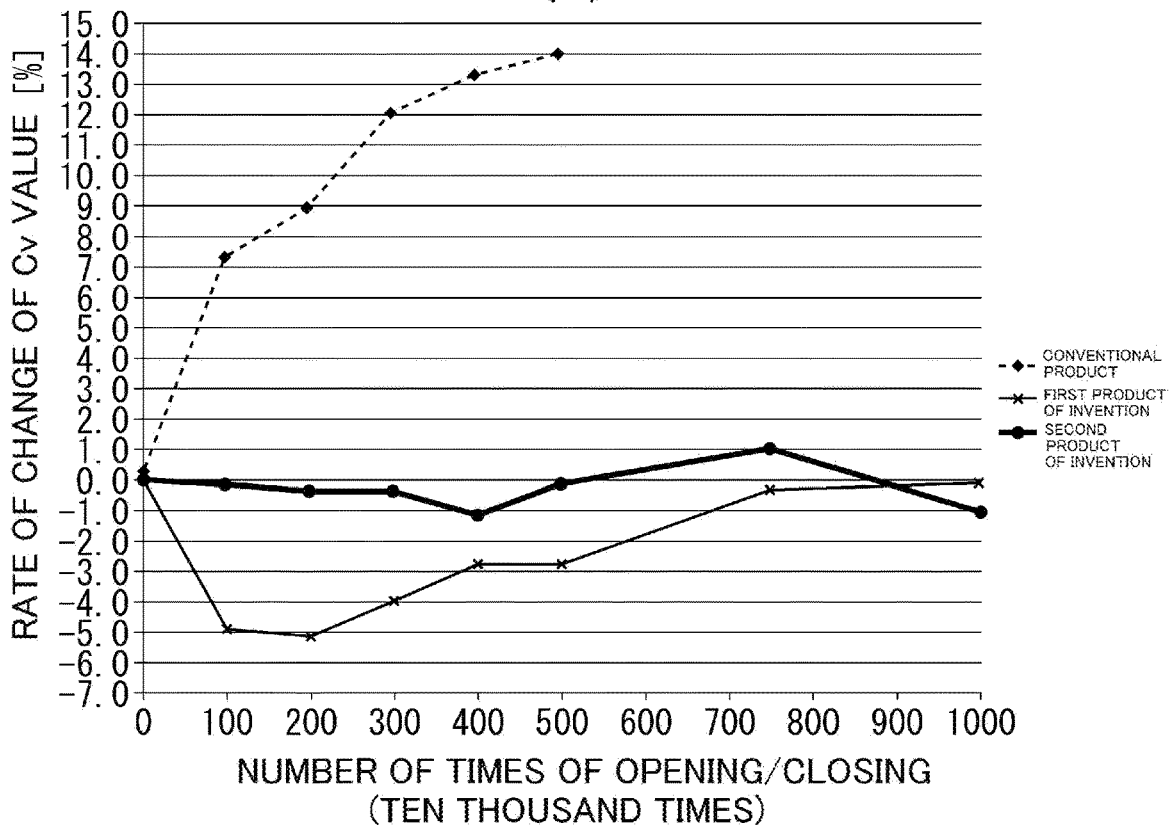

In FIG. 11, in a first product of the invention, the initial Cv value when the number of times of valve opening/closing is 0 was 0.504. Between opening/closing 0 to ten million times, the minimum Cv value was 0.478 and the maximum Cv value was 0.504, and therefore the range of fluctuations was 0.026. In a second product of the invention, the initial Cv value when the number of times of opening/closing is 0 was 0.503. Between opening/closing 0 to ten million times, the minimum Cv value was 0.497 and the maximum Cv value was 0.508, and therefore the range of fluctuations was 0.011. On the other hand, in a conventional product, the initial Cv value when the number of times of opening/closing is 0 was 0.503. At the time of opening/closing approximately four million times before reaching ten million times, the minimum Cv value was already 0.503 and the maximum Cv value was already 0.574, and therefore the range of fluctuations was 0.071. From this graph tendency, it can be assumed that the range of fluctuation is further increased in a region of four million times or more.

In FIG. 11B, rates of change in the above-described experiment example are plotted. As depicted in FIG. 11B, in the first and second products of the present invention, in a state of using a high-temperature fluid at 200 degrees Celsius, fluctuations of the Cv value when the valve is opened and closed 0 to ten million times fall within a range of 10% with respect to the initial Cv value. By contrast, in the conventional product, at the time of opening/closing approximately four million times, fluctuations already significantly exceed 10%. Thus, in the products of the present invention, it can be found that extremely high resistance to Cv value fluctuations of the valve is achieved also for valve opening/closing extremely many times. In FIG. 11B, the first product of the present invention has data slightly below –5%. From the data in FIG. 11B, it can be sufficiently assumed that depending on the sample of the product of the present invention, a product of the present invention with a smaller range of Cv value fluctuations can be achieved. For example, the range of fluctuations is further preferably smaller than 5%.

Furthermore, Table 2 below represents experiment data acquired by using first to third examples of the valve of the present embodiment, with the Cv value of the valve adjusted by the above-described valve stroke adjustment to be 0.5 under an environment at a high temperature of 200° C., and measuring Cv value fluctuations. In Table 2, "ordinary temperatures" contains data measured by opening and closing the valve 0 to ten million times, with the valve of the relevant example being exposed under an environment at ordinary temperatures, and letting a fluid flow when the number of times reaches a predetermined number to measure Cv values. "200° C." contains data measured by opening and closing the valve 0 to ten million times, with the valve of the relevant example being exposed under an environment at 200° C., and letting a fluid flow when the number of times reaches a predetermined number to measure Cv values. "Difference" is a difference between Cv values at ordinary temperatures and 200° C. at the relevant number of times.

TABLE 2

| | FIRST EXAMPLE | | | SECOND EXAMPLE | | | THIRD EXAMPLE | | |
|---|---|---|---|---|---|---|---|---|---|
| | ORDINARY TEMPERATURES | 200° C. | DIFFERENCE | ORDINARY TEMPERATURES | 200° C. | DIFFERENCE | ORDINARY TEMPERATURES | 200° C. | DIFFERENCE |
| OUTSET | 0.587 | 0.504 | 0.083 | 0.601 | 0.498 | 0.103 | 0.598 | 0.503 | 0.095 |

TABLE 2-continued

|  | FIRST EXAMPLE | | | SECOND EXAMPLE | | | THIRD EXAMPLE | | |
| --- | --- | --- | --- | --- | --- | --- | --- | --- | --- |
|  | ORDINARY TEMPERATURES | 200° C. | DIFFERENCE | ORDINARY TEMPERATURES | 200° C. | DIFFERENCE | ORDINARY TEMPERATURES | 200° C. | DIFFERENCE |
| FIVE HUNDRED THOUSAND TIMES | 0.597 | 0.484 | 0.113 | 0.610 | 0.497 | 0.113 | 0.611 | 0.496 | 0.115 |
| ONE MILLION TIMES | 0.602 | 0.479 | 0.123 | 0.614 | 0.503 | 0.111 | 0.619 | 0.501 | 0.117 |
| TWO MILLION TIMES | 0.600 | 0.478 | 0.122 | 0.613 | 0.502 | 0.111 | 0.616 | 0.501 | 0.115 |
| THREE MILLION TIMES | 0.612 | 0.484 | 0.128 | 0.623 | 0.501 | 0.122 | 0.623 | 0.501 | 0.122 |
| FOUR MILLION TIMES | 0.598 | 0.490 | 0.108 | 0.589 | 0.503 | 0.086 | 0.610 | 0.497 | 0.113 |
| FIVE MILLION TIMES | 0.606 | 0.490 | 0.116 | 0.624 | 0.514 | 0.110 | 0.614 | 0.502 | 0.112 |
| SEVEN MILLION and FIVE HUNDRED THOUSAND TIME | 0.604 | 0.502 | 0.102 | 0.625 | 0.519 | 0.106 | 0.611 | 0.508 | 0.103 |
| TEN MILLION TIMES | 0.623 | 0.503 | 0.120 | 0.634 | 0.497 | 0.137 | 0.623 | 0.497 | 0.126 |

As depicted in Table 2, in any of the first to third examples, it is demonstrated that, at least at all times of valve opening/closing 0 to ten million times, the difference between the Cv value at ordinary temperatures and 200° C. (that is, entire data in "Difference" of Table 2) is equal to or smaller than 0.15 and a Cv value fluctuation after valve opening/closing ten million times at 200° C. (that is, a difference between data on the uppermost row (Outset) and data on the lowermost row of the column "200° C.") is equal to or smaller than 10% with respect to the initial Cv value.

Furthermore, the present invention is not limited to the description of the above embodiments, and can be variously modified in a range not deviating from the gist of the invention described in claims of the present invention.

What is claimed is:

1. A fluid control valve comprising:
   a body having an inflow port and an outflow port;
   an annular valve seat provided inside the body; and
   a metal diaphragm opposed to the annular valve seat and configured to move in an ascending/descending direction so as to be in contact therewith or away therefrom by an ascending/descending motion of an actuator rod or a manual rod,
   wherein a contact surface, which is an upper surface of the annular valve seat, is configured to be in contact with and away from the metal diaphragm and has a tapered surface formed along a centripetal direction of the annular valve seat,
   a diaphragm piece disposed above the metal diaphragm and configured to move concentrically with the annular valve seat in conjunction with the ascending/descending motion of any of the rods, a lower surface of the diaphragm piece is formed as a convex curved surface shape symmetrical with respect to an axial center thereof, and
   wherein the tapered surface has a tilted angle smaller by 0.5 to 1 degree than an angle θ of a tilted surface formed on the lower surface of the diaphragm piece at any intermediate position between an outer diameter and an inner diameter of the contact surface, thereby the lower surface of the diaphragm piece is attached to the contact surface via the metal diaphragm from the inner diameter side to the outer diameter side at the time of valve-closing and sealing.

2. The fluid control valve according to claim 1, further comprising:
   an attachment groove fixing the annular valve seat, the attachment groove comprising an inner diameter side swaging part and an outer diameter side swaging part,
   a first length is defined as a length in an axial center direction of the fluid control valve between an upper end of the outer diameter side swaging part and an end of the contact surface on the outer diameter side, and
   a second length is defined as a length in the axial center direction of the fluid control valve between an upper end of the inner diameter side swaging part and an end of the contact surface on the inner diameter side, and
   both of the first length and the second length are equal to or larger than 0.05 mm and equal to or smaller than 0.2 mm.

3. The fluid control valve according to claim 2, wherein the inner and outer diameter side swaging parts are provided with starting points at which a transition of thicknesses thereof discontinuously change along the axial center direction of the fluid control valve, and the inner and outer diameter side swaging parts are formed to be thin on an upper side and to be thick on a lower side respectively with starting points each as a boundary, thereby the inner and the outer diameter side swaging parts are bent and deformed by swaging deformation toward the fixed annular valve seat side with starting points each as bending origins.

4. The fluid control valve according to claim 1, further comprising an actuator for operating the metal diaphragm, wherein the actuator has a rod for opening and closing the metal diaphragm via the diaphragm piece by reciprocating movements and a piston for operating the rod by receiving an air pressure, and the rod and the piston are provided as separate members and are coupled via a predetermined seal material.

5. The fluid control valve according to claim 1, wherein a difference between Cv values of the valve at ordinary temperatures and 200 degrees Celsius is equal to or smaller than 0.15 based on a stroke adjustment by lowering an upper end of a rod of an actuator below a maximum position corresponding to a maximum swelling height of the metal diaphragm.

6. The fluid control valve according to claim 1, wherein a range of fluctuations of a Cv value of the fluid control valve while the fluid control valve is performing opening/closing operation from 0 to ten million times under high temperatures is kept within 10% with respect to an initial Cv value.

* * * * *